US011184935B2

United States Patent
Lee et al.

(10) Patent No.: US 11,184,935 B2
(45) Date of Patent: Nov. 23, 2021

(54) METHOD AND APPARATUS FOR OPERATING WIRELESS COMMUNICATION SYSTEM HAVING SEPARATED MOBILITY MANAGEMENT AND SESSION MANAGEMENT

(71) Applicant: Samsung Electronics Co., Ltd., Suwon-si (KR)

(72) Inventors: Jinsung Lee, Suwon-si (KR); Kisuk Kweon, Suwon-si (KR); Jungshin Park, Seoul (KR); Daegyun Kim, Seongnam-si (KR); Sangjun Moon, Seoul (KR); Beomsik Bae, Suwon-si (KR); Joohyung Lee, Gwacheon-si (KR); Jicheol Lee, Suwon-si (KR); Hyungho Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 200 days.

(21) Appl. No.: 16/327,139

(22) PCT Filed: Aug. 22, 2017

(86) PCT No.: PCT/KR2017/009142
§ 371 (c)(1),
(2) Date: Feb. 21, 2019

(87) PCT Pub. No.: WO2018/038503
PCT Pub. Date: Mar. 1, 2018

(65) Prior Publication Data
US 2020/0187277 A1    Jun. 11, 2020

Related U.S. Application Data

(60) Provisional application No. 62/377,889, filed on Aug. 22, 2016.

(51) Int. Cl.
*H04W 76/12* (2018.01)
*H04W 76/11* (2018.01)
(Continued)

(52) U.S. Cl.
CPC ............ *H04W 76/12* (2018.02); *H04W 76/11* (2018.02); *H04W 76/32* (2018.02); *H04W 92/045* (2013.01)

(58) Field of Classification Search
USPC ........................................... 370/329
See application file for complete search history.

(56) References Cited

U.S. PATENT DOCUMENTS 10,098,042 B2 * 10/2018 Lee .................... H04W 36/0011
10,356,689 B2 *  7/2019 Chan .................... H04W 76/10
(Continued)

FOREIGN PATENT DOCUMENTS

EP          2 214 451 B1    3/2012
KR    10-2008-0063844 A    7/2008
(Continued)

OTHER PUBLICATIONS

Siwar Ben Hadj Said, New Control Plane in 3GPP LTE/EPC Architecture for On-Demand Connectivity Service, In: Cloud Networking(CloudNet) 2013: 2nd IEEE International Conference on Cloud Networking, San Francisco, United States, pp. 1-5.
(Continued)

*Primary Examiner* — Gregory B Sefcheck
*Assistant Examiner* — Majid Esmaeilian
(74) *Attorney, Agent, or Firm* — Jefferson IP Law, LLP

(57) ABSTRACT

The present invention defines signaling required for separating a network entity (NE) responsible for mobility management (MM) and session management (SM), which are main function of a control plane (CP) in a next generation (NextGen) mobile communication system, and presents a basic procedure for providing mobile communication services including the signaling. Therefore, complexity of core equipment responsible for the CP is reduced in order to implement a network slice function and provide various (Continued)

levels of mobility, and an effect of minimizing a signaling load therebetween can be obtain. In addition, it is possible to efficiently manage the resources of a base station (radio access network (RAN)) and a user plane network entity (UP NF).

20 Claims, 17 Drawing Sheets

(51) Int. Cl.
*H04W 76/32* (2018.01)
*H04W 92/04* (2009.01)

(56) References Cited

U.S. PATENT DOCUMENTS

| | | | |
|---|---|---|---|
| 2007/0104116 | A1 | 5/2007 | Olvera-Hernandez |
| 2008/0233947 | A1 | 9/2008 | Herrero-Veron |
| 2009/0016258 | A1 | 1/2009 | Zhang et al. |
| 2017/0127471 | A1* | 5/2017 | Yu .......................... H04W 4/80 |
| 2017/0290082 | A1* | 10/2017 | Salkintzis ............ H04W 36/18 |
| 2017/0374542 | A1 | 12/2017 | Ryu et al. |
| 2018/0227807 | A1* | 8/2018 | Youn .................... H04W 36/12 |
| 2019/0208465 | A1* | 7/2019 | Mihaly .................. H04W 8/26 |
| 2019/0364541 | A1* | 11/2019 | Ryu ...................... H04W 72/02 |
| 2020/0059989 | A1* | 2/2020 | Velev ................... H04W 36/12 |

FOREIGN PATENT DOCUMENTS

| | | |
|---|---|---|
| KR | 10-2010-0037601 A | 8/2010 |
| WO | 2016-114611 A1 | 7/2016 |

OTHER PUBLICATIONS

Hailan Peng, 'Extended User/Control Plane Architectures for Tightly Coupled LTE/WiGig Interworking in Millimeter-wave Heterogeneous Networks', In: 2015 IEEE Wireless Communications and Networking Conference (WCNC): Track 3: Mobile and Wireless Networks, pp. 1-6.
Extended European Search Report dated May 9, 2019, issued in a counterpart European application No. 17843923.8-1215 / 3490297.
Samsung: "Update to Solution 5.3: Re-selection of user-plane path based on UE traffic pattern", 3GPP Draft; S2-163984_WAS_S2-163298, 3rd Generation Partnership Project (3GPP), Mobile Competence Centre; 650, Route Des Lucioles ; F-06921 Sophia-Antipolis Cedex ; France, vol. SA WG2, No. XP051121668, Jul. 11, 2016-Jul. 15, 2016 Jul. 17, 2016, Vienna, Austria. Retrieved from the Internet: URL:http://www.3gpp.org/ftp/tsg_sa/WG2_Arch/TSGS2_116_Vienna/Docs/.
Qualcomm Incorporated: "Solution X for Key Issue 4 on Session Management", 3GPP Draft; S2-162264_E-MAIL_REV1 0_S2-162159-WAS-162091-WAS-162087-WAS-161494-NEXTGEN-SM, 3rd Generation Partnership Project (3GPP), Mobile Competence Centre; 650, Route Des Lucioles ; F-06921 'Sophia, vol. SA WG2, No. XP051 089284; Apr. 11, 2016-Apr. 15, 2016; Apr. 22, 2016, Sophia Antipolis, France. Retrieved from the Internet: URL:http://www.3gpp.org/ftp/tsg_sa/WG2_Arch/TSGS2_114_Sophia_.
China Mobile: "Work Task Description on Session Management", 3GPP Draft; S2-162931 WAS 2419-WTS#4-SM-V5, 3rd Generation Partnership Project (3GPP), Mobile Competence Centre; 650, Route Des Lucioles ; F-06921 Sophia-Antipolis Cedex ; France, vol. SA WG2, No. Nanjing; May 23, 2016-2016052727; XP051116449, May 27, 2016, P.R. China. Retrieved from the Internet: URL:http://www.3gpp.org/ftp/tsg_sa/WG2_Arch/ TSGS2_115_Nanjing_China/ Docsl.
European Office Action dated May 13, 2020, issued in a counterpart European application No. 17 843 923.8-1215.
Huawei, HiSilicon,CATT; 3GPP TSG SA WG2 Meeting #116; Solution to 4.x: The interaction between MM and SM; Discussion and approval; S2-164107; Jul. 17, 2016, Vienna, Austria.
Motorola Mobility, Lenovo; SA WG2 Meeting #120; Corrections to PDU session establishment procedure; Approval; S2-171948; Mar. 21, 2017, Busan, South Korea.
Indian Office Action dated Sep. 15, 2021, issued in a counterpart an Indian Application No. 201937006961.

* cited by examiner

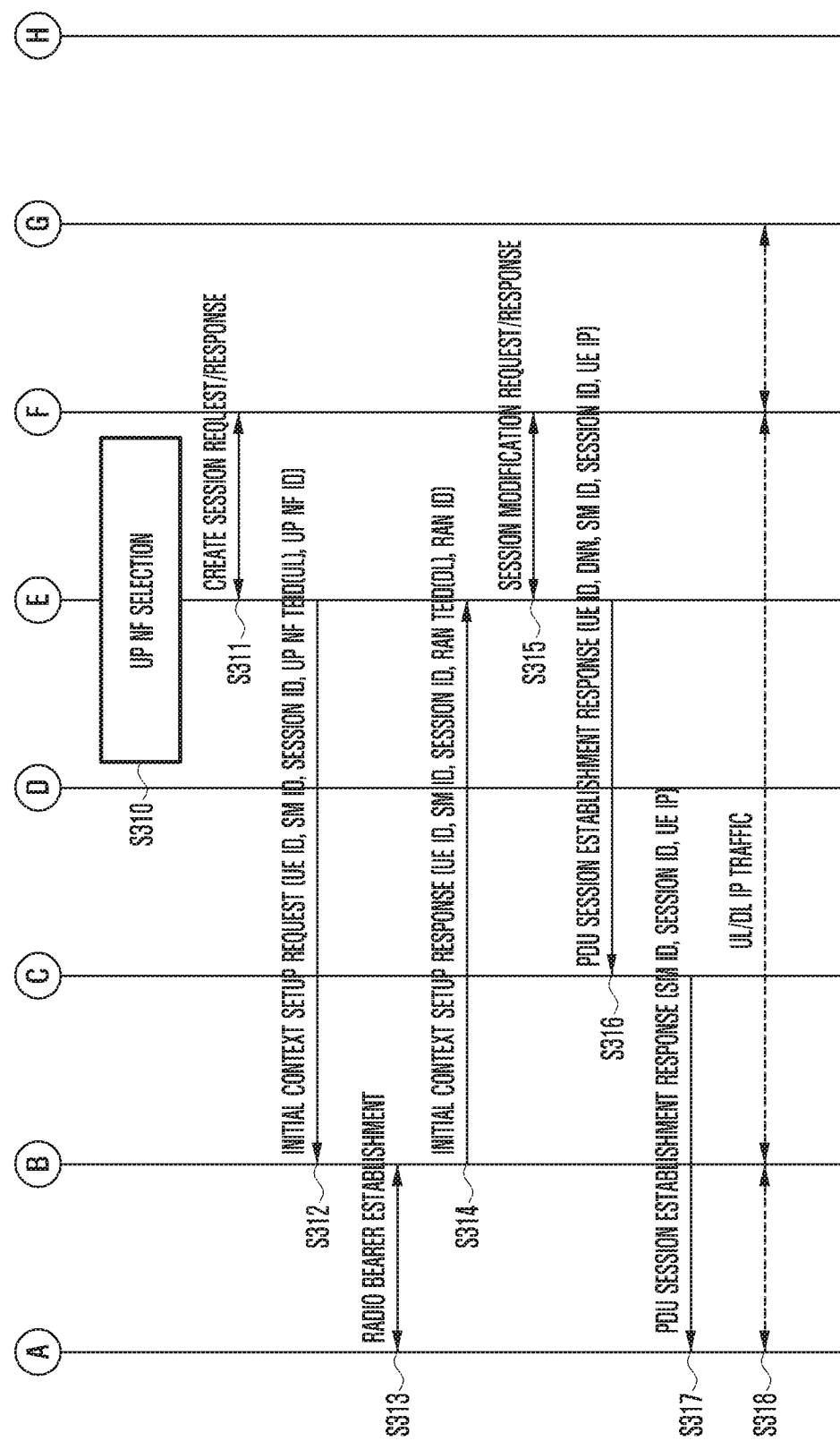

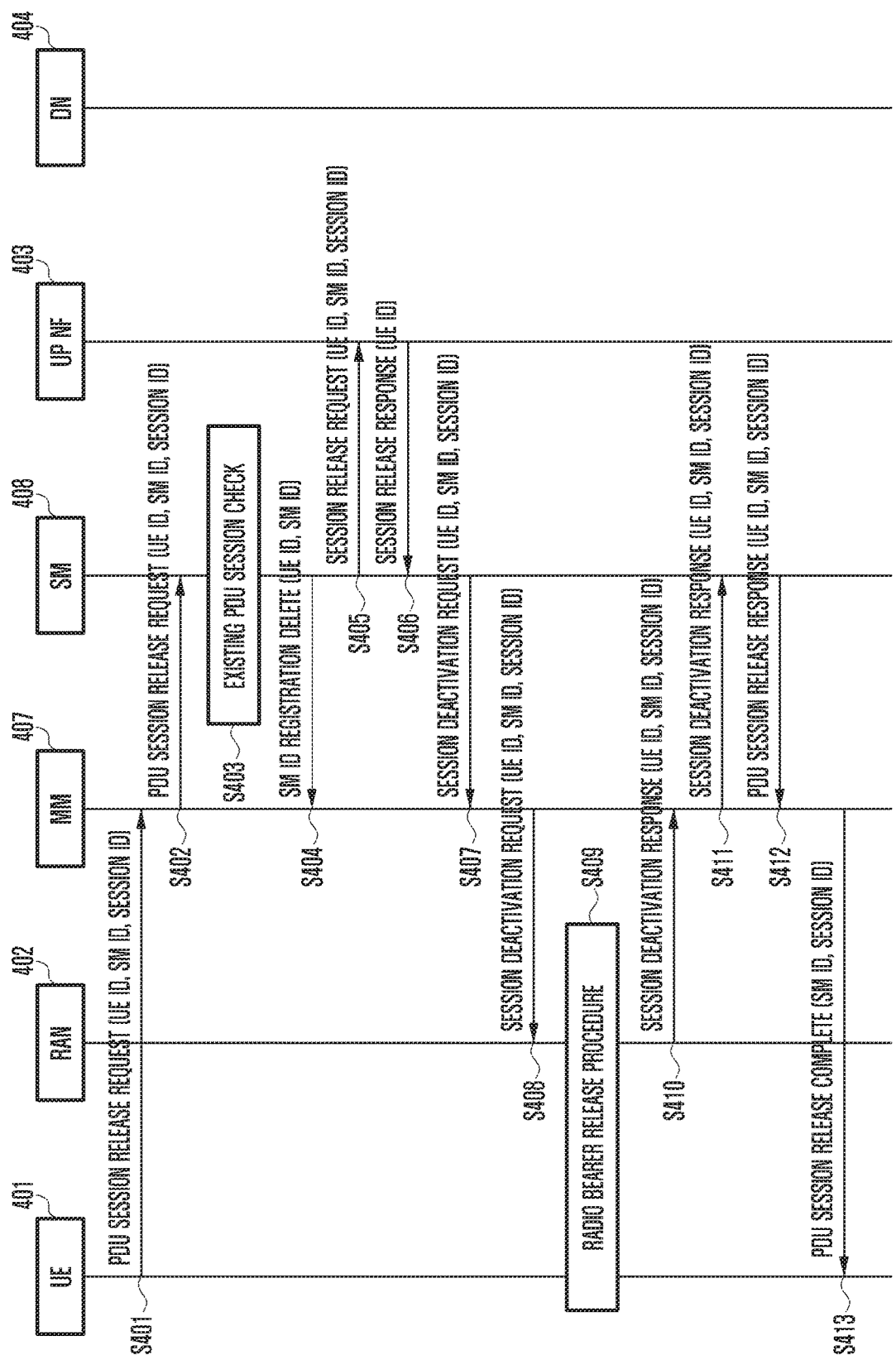

METHOD AND APPARATUS FOR OPERATING WIRELESS COMMUNICATION SYSTEM HAVING SEPARATED MOBILITY MANAGEMENT AND SESSION MANAGEMENT

TECHNICAL FIELD

The present invention relates to a 5G cellular communication system and, particularly, to a method for supporting a structure of separating mobility management and session management on a control plane of a core equipment.

BACKGROUND ART

In order to evolve a 5G system from the existing 4G LTE system, the 3GPP, which is in charge of the cellular mobile communication standard, has named a new core network structure as NextGen Core (NG Core) and is proceeding with standardization.

Compared to Evolved Packet Core (EPC) which is a network core for the existing 4G, the NG Core aims to support the following differentiated functions. First, a network slice function is introduced. As the requirement of the 5G, the NG Core should support various terminal types and services. For example, it is required to support terminal types and services such as enhanced Mobile Broadband (eMBB), Ultra Reliable Low Latency Communications (URLLC), and massive Machine Type Communications (mMTC).

Each terminal/service has different requirements for the core network. For example, an eMBB service may require a high data rate, and a URLLC service may require high stability and low latency. A technique to satisfy these various service requirements is a network slice scheme.

The network slice is a way of creating multiple logical networks through virtualization of a single physical network. First, each network slice instance (NSI) may have different characteristics. This is realized when each NSI has a network function (NF) corresponding to the characteristic thereof. For example, it is possible to efficiently support various 5G services by allocating a suitable NSI for a required service characteristic to each terminal.

Second, a mobility management function and a session management function may be separated. In the existing 4G LTE, all terminals can receive services from the network through a signaling exchange with single core equipment called a Mobility Management Entity (MME) responsible for registration, authentication, mobility management, and session management functions. However, because the number of terminals is explosively increased in the 5G and also the mobility and traffic/session characteristics to be supported according to the terminal type are divided, supporting all functions at single equipment such as the MME causes lower efficiency. Therefore, in order to improve the efficiency in terms of function/implementation complexity and signaling load of the core equipment responsible for the control plane, an approach of separating the mobility management function and the session management function is being discussed intensively.

DISCLOSURE OF INVENTION

Technical Problem

It is an object of the present invention to define essential signaling between network entities in a structure where a mobility management function and a session management function are separated from each other in a core of a cellular mobile communication system. In particular, when a terminal sets up a plurality of Protocol Data Unit (PDU) sessions, a procedure between a terminal and a network entity is defined to selectively operate respective data transmission paths.

Solution to Problem

According to an embodiment of the present invention, a method of a terminal may comprise selecting a Protocol Data Unit (PDU) session for transmission of data from among at least one inactivated PDU session; transmitting a service request message including identification information of the selected session to a mobility management function element for managing mobility of the terminal; and transmitting the data through the selected PDU session activated based on the service request message.

In addition, according to an embodiment of the present invention, a method of a mobility management function element may comprise receiving, from a terminal, a service request message including identification information of a specific Protocol Data Unit (PDU) session; and transmitting, to a specific session management function element corresponding to the identification information of the specific PDU, a path setup trigger message for data transmission to a user plane network function element of the terminal.

In addition, according to an embodiment of the present invention, a method of a session management function element may comprise receiving, from a mobility management function element for managing mobility of terminal, a path setup trigger message for data transmission to a user plane network function element of the terminal; and transmitting signaling related to the path setup to the mobility management function element, wherein the path setup trigger message is received when the mobility management function element determines that a specific Protocol Data Unit (PDU) session for the data transmission is managed by the session management function element, and wherein the specific PDU session is selected by the terminal from among at least one inactivated PDU session.

According to an embodiment of the present invention, a terminal may comprise a transceiver and a controller configured to select a Protocol Data Unit (PDU) session for transmission of data from among at least one inactivated PDU session, to control the transceiver to transmit a service request message including identification information of the selected session to a mobility management function element for managing mobility of the terminal, and to control the transceiver to transmit the data through the selected PDU session activated based on the service request message.

In addition, according to an embodiment of the present invention, a mobility management function element may comprise a transceiver configured to receive, from a terminal, a service request message including identification information of a specific Protocol Data Unit (PDU) session; and a controller configured to control the transceiver to transmit, to a specific session management function element corresponding to the identification information of the specific PDU, a path setup trigger message for data transmission to a user plane network function element of the terminal.

In addition, according to an embodiment of the present invention, a session management function element may comprise a transceiver configured to receive, from a mobility management function element for managing mobility of terminal, a path setup trigger message for data transmission to a user plane network function element of the terminal; and a controller configured to control the transceiver to transmit signaling related to the path setup to the mobility management function element, wherein the path setup trigger message is received when the mobility management function element determines that a specific Protocol Data Unit (PDU) session for the data transmission is managed by the session management function element, and wherein the specific PDU session is selected by the terminal from among at least one inactivated PDU session.

Advantageous Effects of Invention

As described above, the present invention can reduce the implementation complexity of the core equipment responsible for the control plane (CP) to implement a network slice function and provide various levels of mobility, thus minimizing a signaling load therebetween. In addition, even if the terminal frequently performs handover, it is possible to reduce the signaling load between the base station (radio access network (RAN)) and the NF of the core network and also efficiently manage the resources of the user plane network entity (UP NF).

BRIEF DESCRIPTION OF DRAWINGS

FIGS. 3A and 3B are diagrams illustrating a process of setting up a session related to a terminal according to another embodiment of the present invention.

FIG. 4 is a diagram illustrating a PDU session release procedure according to an embodiment of the present invention.

MODE FOR THE INVENTION

Now, embodiments of the present invention will be described in detail with reference to the accompanying drawings. In the following description of the present invention, detailed description of known functions and configurations incorporated herein will be omitted when it may make the subject matter of the present invention rather unclear. The following terms are defined in consideration of the functions of the present invention, and may be changed according to the intention of the user, the operator, or the like. Therefore, the definition should be based on the contents throughout this specification.

In this disclosure, a base station (BS), which is an entity of performing resource allocation for a terminal, may be at least one of an evolved Node B (eNode B), a Node B, a radio access network, a radio access unit, a base station controller, or a node on the network. A terminal may include a user equipment (UE), a mobile station (MS), a cellular phone, a smart phone, a computer, or a multimedia system capable of performing communication function.

In this disclosure, a downlink (DL) is a wireless transmission path of a signal transmitted from a base station to a terminal, and an uplink (UL) is a wireless transmission path of a signal transmitted from a terminal to a base station. In the following, embodiments of the present invention will be described using the LTE or LTE-A system as an example, but such embodiments may be also applied to any other communication system having a similar technical background or channel form. It is apparent to a person skilled in the art that embodiments of the invention may be applied to other communication systems through some modifications within the scope of the invention.

Briefly, the present invention defines a new signaling between a mobility management apparatus and a session management apparatus in a core of a cellular mobile communication system, thereby proposing a service provision procedure that satisfies various requirements of a network operator and a terminal. Necessaries are as follows.

Hereinafter, for convenience, a terminal and a UE are used interchangeably, and also a base station and an RAN are used interchangeably. In addition, terms used in describing embodiments of the invention may be replaced by other terms. For example, a user plane network function (UP NF) may be replaced with a user plane function (UPF). A mobility management (MM) may be replaced with a mobility management network function (MM NF), a mobility management function (MMF), or an access and mobility function (AMF). A session management (SM) may be replaced with a session management network function (SM NF) or session management function (SMF).

Figure 1:
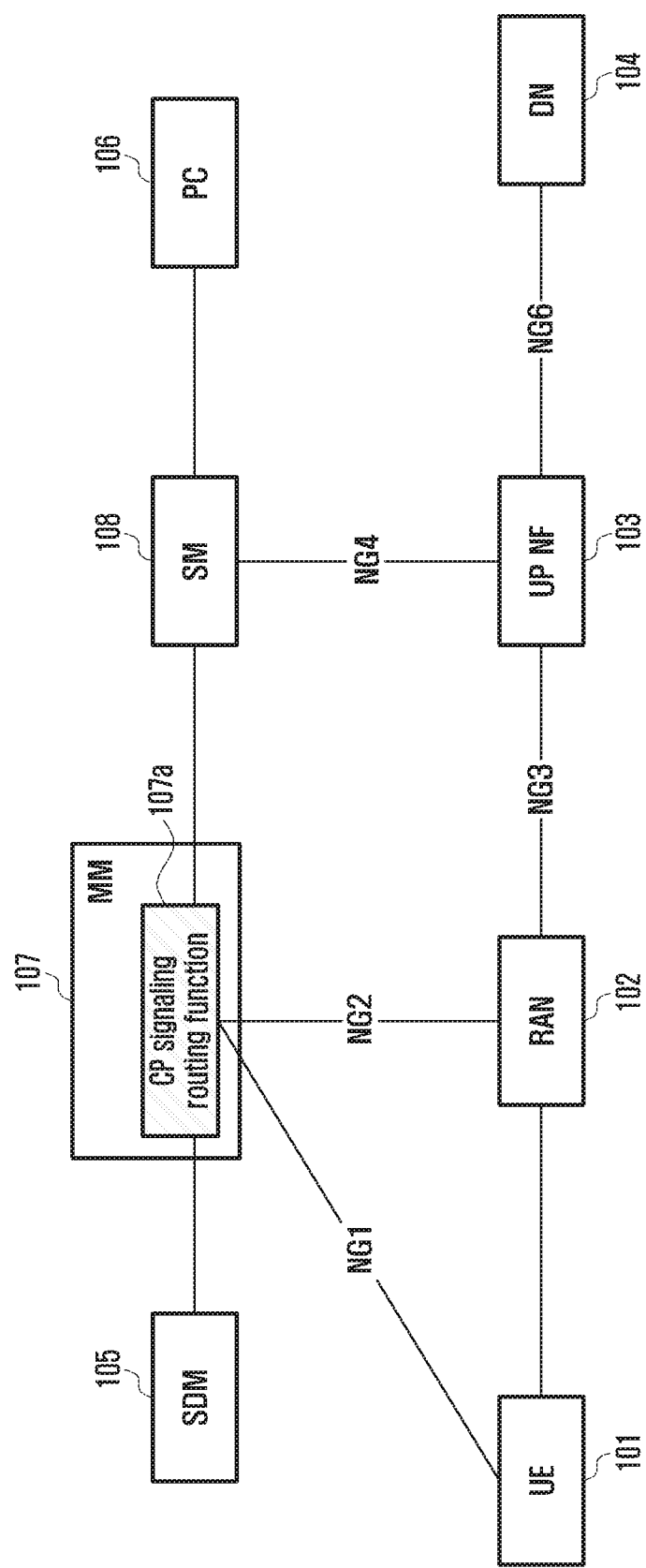
FIG. 1 is a diagram illustrating network architecture of a cellular mobile communication system according to an embodiment of the present invention.

FIG. 1 is a diagram illustrating network architecture of a cellular mobile communication system according to an embodiment of the present invention.

Referring to FIG. 1, a network of a cellular mobile communication system according to an embodiment of the present invention may include a UE 101, an RAN 102, a user plane network function (UP NF) 103, a data network (DN) 104, a subscriber data management (SDM) 105, a mobility management (MM), a session management (SM) 108, and a policy control (PC) 106. In addition, the MM according to an embodiment of the present invention may include a control plane (CP) signaling routing function 107a.

The UP NF 103 according to an embodiment of the present invention is connected to the RAN 102 inside the network through an NG3 (or N3) interface and connected to the DN 104 through an NG6 (or N6) interface. The UP NF 103 includes the role of a gateway (GW) directly connected to network equipment outside the network, and enables data communication between the UE 101 and the DN 104 (e.g., Internet) while being located on a data transmission path with the RAN 102 inside the network.

The SDM 105, which is a server for managing UE subscription information, may perform registration and authentication, and also obtain information when determining a service level to be provided to the UE in the network. The PC 106, which is a server that manages Quality of Service (QoS) rules, is core equipment having to perform an interaction when the SM 108 establishes a transmission path to the UP NF 103 and the RAN 102.

Principal core equipment in the present invention is the MM 107 for managing the mobility of the UE and the SM 108 for managing a session related to the UE. The MM 107 according to an embodiment of the present invention may be connected to the UE 101 through an NG1 (or N1) interface and connected to the RAN 102 via an NG2 (or N2) interface. Also, the SM 108 according to an embodiment of the present invention may be connected to the UP NF 103 via an NG4 (or N4) interface.

The MM 107 responsible for mobility management of the UE has the CP signaling routing function 107a, which performs routing to the MM 107 or the SM 108 depending on whether the destination of signaling sent by the UE 101 or the RAN 102 is the MM 107 or the SM 108. This routing function does not need to interpret what content the signaling message has, so that the MM 107 has an advantage of reduced implementation complexity because of no need of managing the context associated with a session of the UE.

The present invention is described on the assumption that when the UE is allocated a single network slice, it is associated with a plurality of SMs. However, even if the SM is allocated per network slice, the following procedures are all applicable. The network entity name or interface name shown in FIG. 1 may be changed, but its role and function may be maintained. For example, in case of the interface name, NG # may also be represented in the form of N #.

Another important point of the present invention is to efficiently operate a plurality of PDU sessions when the UE sets up (establishes) such PDU sessions. A state of the PDU session may be defined as follows. A state where a user plane (UP) connection of the PDU session is set up and thus allows immediate data transmission is defined as an activated state. On the other hand, a state of requiring a UP connection setup procedure to send data because of no existence of UP connection of the PDU session is defined as a deactivated state.

When the PDU session is set up at the request of the UE or network, a session management function (SMF), which is a core network entity for managing a session, selects a user plane function (UPF) performing the role of a gateway (GW) for connecting the PDU session with an external data network, and sets up a NG3 (or N3) tunnel, which is a data transmission path of the PDU session, between the UPF and the RAN currently accessed by the UE.

Also, a data radio bearer (DRB) for supporting the PDU session is set up between the UE and the RAN. At this time, in order to make the DRB satisfy the QoS requirement of the PDU session, the RAN may set up the DRB that satisfies a plurality of different QoS requirements. The user plane (UP) connection of the PDU session may be composed of the N3 tunnel and the DRB.

If the UE frequently performs handover by movement in a state of activating the UP connection of the PDU session, signaling that enables the N3 tunnel and the DRB constituting the UP connection of the PDU session to change a data transmission path to go via a target RAN from a source RAN occurs. Specifically, even if traffic of an application using the PDU session does not actually occur, the signaling to route the N3 tunnel and DRB of the PDU session to the target RAN is required whenever handover occurs. This signaling overhead problem may become more serious as the number of PDU sessions simultaneously set up by the UE increases. In order to solve this problem, a method of selectively activating and operating the UP connection of the PDU session in which traffic is actually transmitted is proposed.

Figure 5:
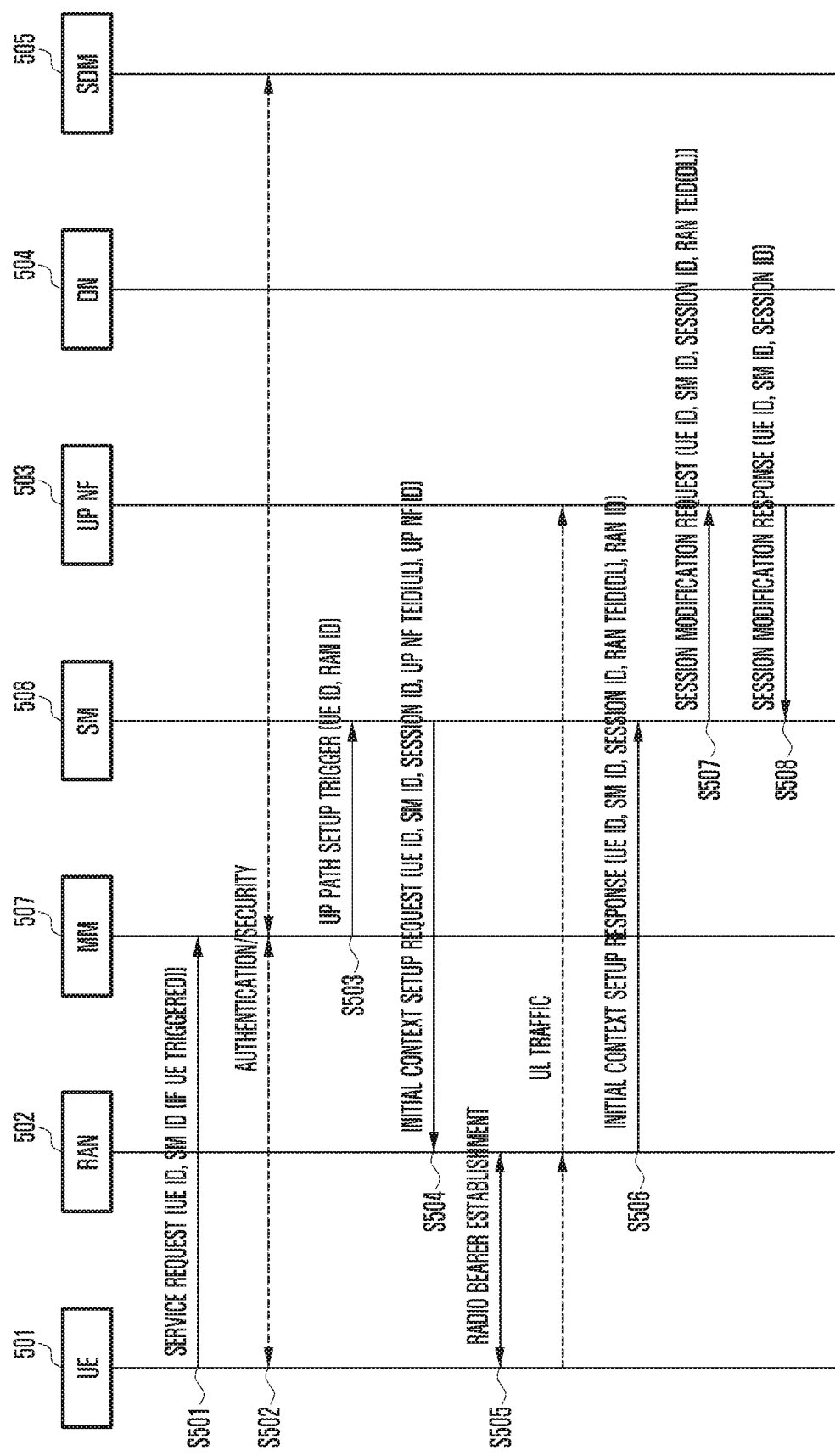
FIG. 5 is a diagram illustrating a signaling and user plane transmission path setup procedure of a terminal in case of uplink traffic in an idle state according to an embodiment of the present invention.
Figure 6:
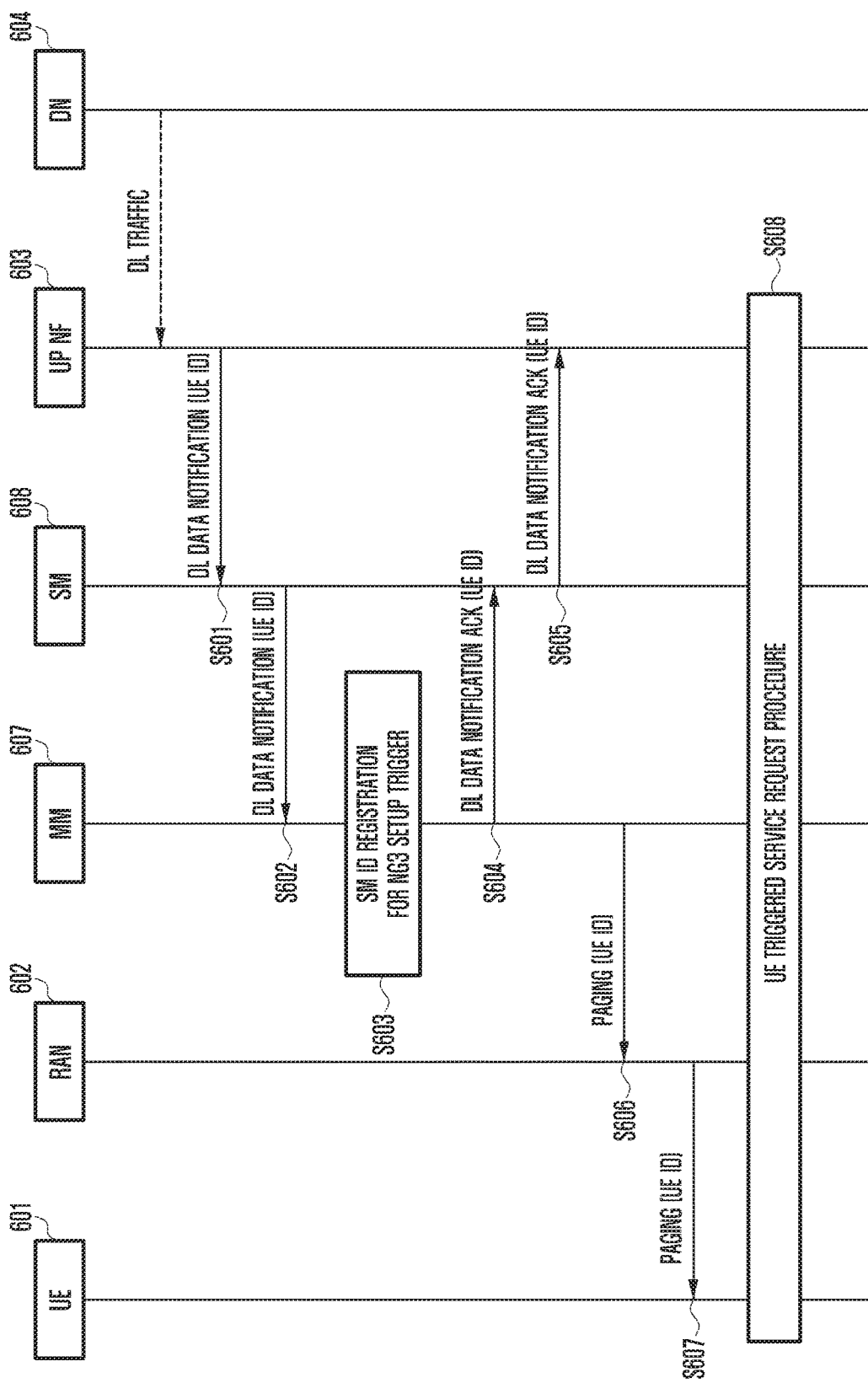
FIG. 6 is a diagram illustrating a process of an idle-state terminal to receive downlink traffic from a data network according to an embodiment of the present invention.

Details will be described later with reference to FIG. 5 illustrating a UE triggered service request procedure and FIG. 6 illustrating a network triggered service request procedure.

Figure 2A:
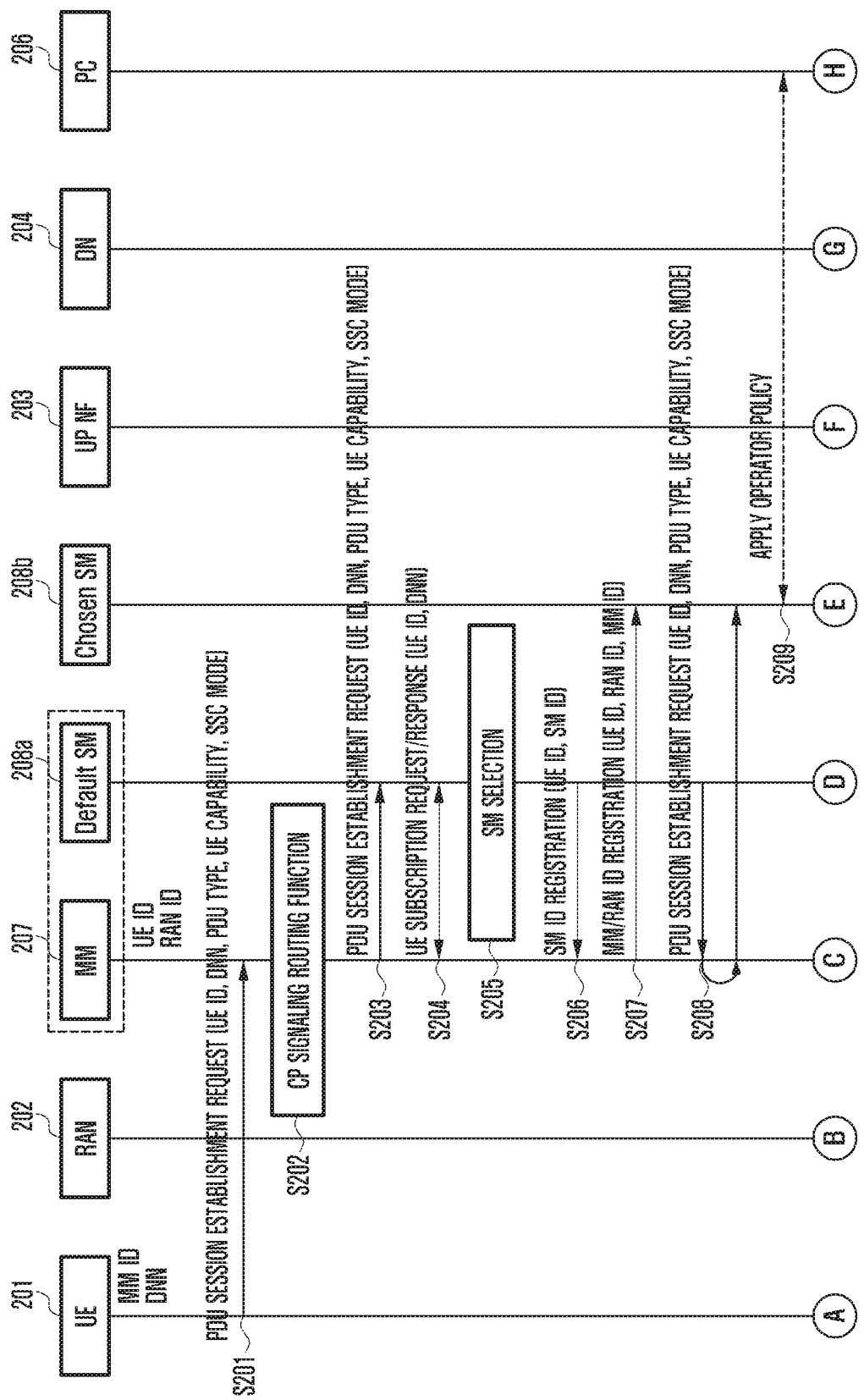
FIGS. 2A and 2B are diagrams illustrating a process of setting up a session related to a terminal according to an embodiment of the present invention.
Figure 2B:
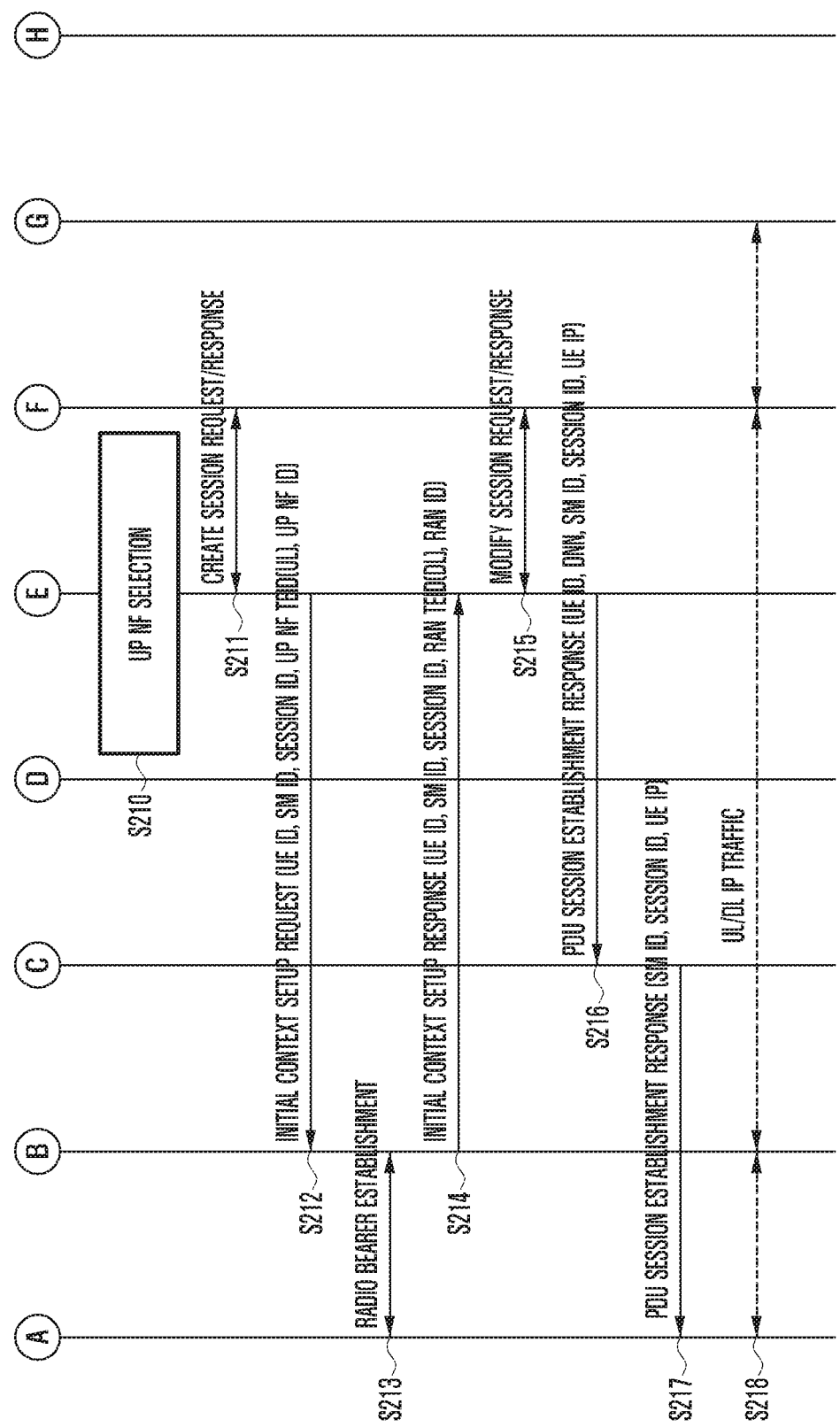

FIGS. 2A and 2B are diagrams illustrating a process of setting up a session related to a terminal according to an embodiment of the present invention.

FIGS. 2A and 2B presume a state where the terminal (UE) has been already registered in the MM through a complete access (attach) to the network in the network architecture shown in FIG. 1. Thus, in this embodiment, the MM 207 has already issued an ID (UE ID) of the UE 201 and knows the RAN 202 to which the UE 201 is attached (e.g., knows an ID (RAN ID) of the RAN to which the UE is attached). Also, the UE 201 according to an embodiment of the invention may be in a state of knowing an ID (MM ID) of the MM 207 and a data network name (DNN).

Now, a procedure is described in which the UE 201 requests a new PDU session establishment for data communication. The PDU session refers to an association between the UE and the data network (DN). The PDU session is similar to a packet data network (PDN) connection in the 4G LTE, and may include an Internet Protocol (IP), non-IP, and Ethernet. In addition, as an ID of each network entity, an IP address, a system ID, and any other identifier capable of distinguishing each entity in the network may be used.

Referring to FIGS. 2A and 2B, the UE 201 transmits a PDU session establishment request message to the MM 207 (S201). Here, the PDU session establishment request message may contain a UE ID, a DNN, a PDU type, a UE capability, and session and service continuity (SSC) mode information.

Upon receiving the PDU session establishment request message, the MM 207 performs a signaling routing function (S202). If an SM ID is not specified, the MM 207 forwards or relays, as a result of performing the signaling routing function, the PDU session establishment request message to a default SM 208a (S203). Here, the MM 207 and the default SM 208a may be co-located at the same place. Through the forwarding process (S203), the UE ID, the DNN, the PDU type, the UE capability, and the SSC mode information contained in the PDU session establishment request message may be delivered to the default SM 208a.

If the MM 207 has UE subscription information through the attach process of the UE, the UE ID and the DNN may be transmitted to the default SM 208a through a process of UE subscription request/response (S204) between the MM 207 and the default SM 208a.

The default SM 208a selects a suitable SM (S205) by performing a session management (SM) selection, based on the UE subscription, the DNN, the PDU type, the UE capability, and the SSC mode. At this time, the default SM 208a transmits the selected SM ID and UE ID to the MM 207 so that the selected SM ID and UE ID can be registered in the MM 207 (S206). Also, the MM 207 performs transmission, to a chosen SM 208b, for registration of an MM ID and an RAN ID to which the UE 201 belongs (S207). Then, the default SM 207a delivers the received PDU session establishment request to the chosen SM 208b through the MM 207 (S208).

After receiving the PDU session establishment request, the chosen SM 208b performs a process of applying an operator policy (S209) with the PC 206 and selects the UP NF 203 (S210). Then, the chosen SM 208b performs a transmission path setup with the selected UP NF 203 and DN 204. For example, the chosen SM 208b may send a session creation request to the selected UP NF 203 and receive a response to the session creation request from the UP NF 203 (S211).

Meanwhile, the chosen SM 208b also performs a transmission path setup with the RAN 202. For example, the chosen SM 208b may transmit, to the RAN 202, an initial context setup request that contains the UE ID, the SM ID, a session ID, an RAN tunnel endpoint ID (TEID) for uplink, and the RAN ID (S212). Then, the RAN 202 establishes a radio bearer with the UE 201 (S213) and may transmit an initial context setup response to the chosen SM 208b (S214). Here, the initial context setup response may contain the UE ID, the SM ID, the session ID, the RAN TEID [DL], and the RAN ID.

Upon reception of the initial context setup response, the chosen SM 208b performs a session modification request/response process with the UP NF 203 (S215). As a result, the transmission path setup is completed between the DN 204, the UP NF 203, the RAN 202, and the UE 201. When the transmission path setup is completed, the chosen SM 208b transmits, to the MM 207, a PDU session establishment response signaling including the UE ID, the DNN, the SM ID, the session ID, and a UE IP (S216), and the MM 207 may transmit a PDU session establishment response including the SM ID, the session ID, and the UE IP to the UE 201 (S217). Then, the UE 201 can transmit/receive uplink/downlink IP traffic (data communication) with the DN 204 through the set transmission path (S218).

Figure 3A:
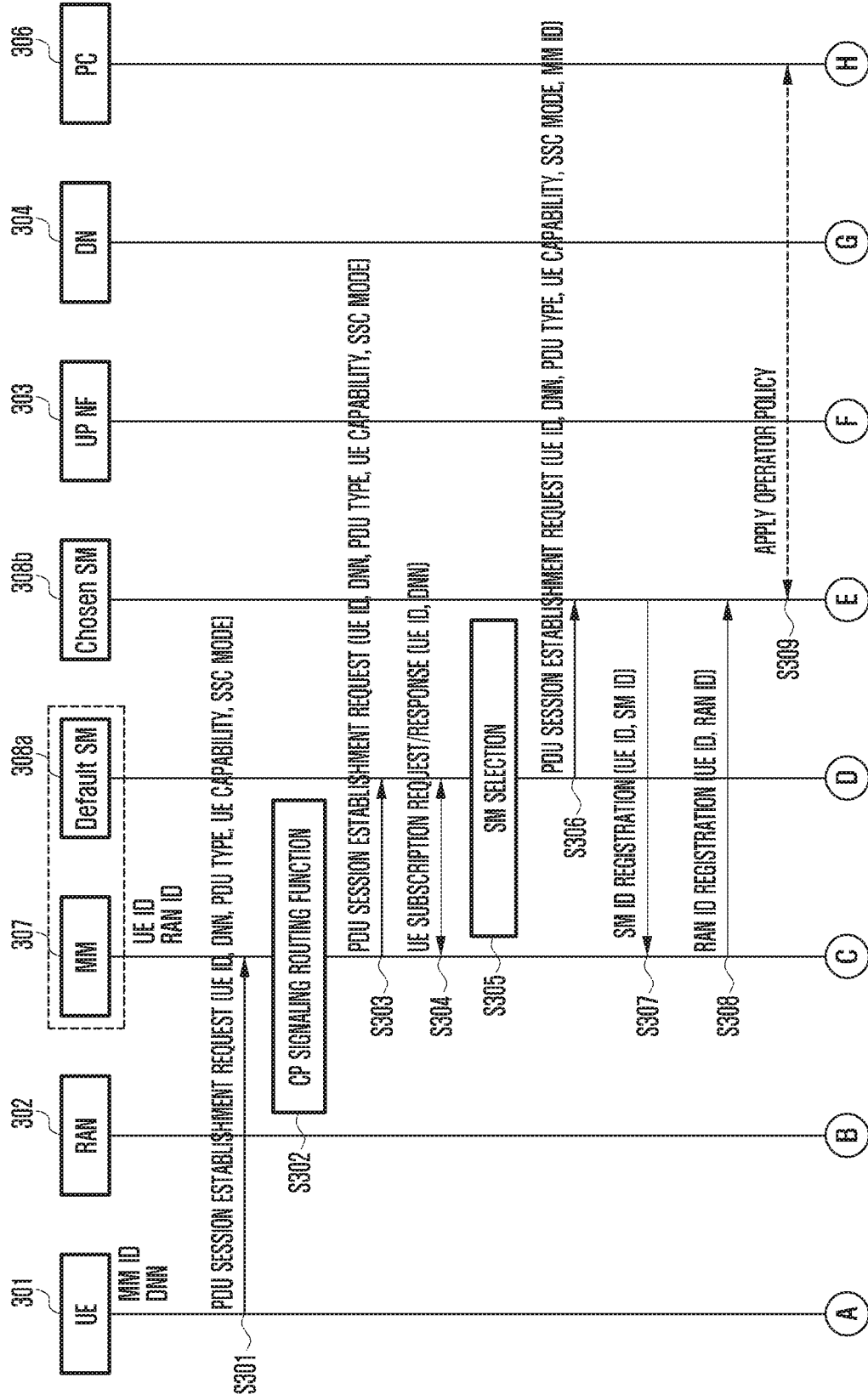

FIGS. 3A and 3B are diagrams illustrating a process of setting up a session related to a terminal according to another embodiment of the present invention.

Referring to FIGS. 3A and 3B, the terminal (UE) 301 transmits a PDU session establishment request to the MM 307 (S301). Like the above case as shown in FIGS. 2A and 2B, it is assumed that the UE has been already registered in the MM through a complete access (attach) to the network in the network architecture according to an embodiment of the invention. That is, the UE 301 knows the MM ID and the DNN, and the MM 307 may know the UE ID and the RAN ID. Also, as in FIGS. 2A and 2B, the PDU session establishment request may contain the UE ID, the DNN, the PDU type, the UE capability, and the SSC mode.

The MM 307 performs a signaling routing function (S302). If the SM ID is not specified, the MM 307 may relay the PDU session establishment request to the default SM 308a. As described above with reference to FIGS. 2A and 2B, the MM 307 and the default SM 308a may be co-located. Therefore, the UE ID, the DNN, the PDU type, the UE capability, and the SSC mode information may be included in the PDU session establishment request message and transmitted to the default SM 308a.

Assuming that the MM 307 has UE subscription information through the attach process of the UE, the UE ID and the DNN may be transmitted to the default SM 308a through a process of UE subscription request/response (S304) between the MM 307 and the default SM 308a. Then, the default SM 308a selects a suitable SM (S305) by performing a session management (SM) selection, based on the UE subscription, the DNN, the PDU type, the UE capability, and the SSC mode.

Unlike FIGS. 2A and 2B, in this embodiment, the chosen SM 308b may directly register with the MM. Specifically, the default SM 308a may send a PDU session establishment request to the chosen SM 308b. At this time, the PDU session establishment request may contain the UE ID, the DNN, the PDU type, the UE capability, the SSC mode, and the MM ID. As an example, the MM ID may be transferred from the default SM 308a to the chosen SM 308b via other signaling.

Thereafter, the chosen SM 308b performs the SM ID registration with the MM 307 through a signaling including the UE ID and the SM ID (S307). In response, the MM 307 may send a signaling including the UE ID and the RAN ID to the chosen SM 308b to perform the RAN ID registration process with the chosen SM 308b (S308).

In addition, the chosen SM 308b performs a process of applying an operator policy (S309) with the PC 306 and selects the UP NF (S310). Then, the chosen SM 308b performs a transmission path setup with the selected UP NF 303 and DN 304. For example, the chosen SM 308b may send a session creation request to the selected UP NF 303 and receive a response to the session creation request from the UP NF 303 (S311).

Meanwhile, the chosen SM 308b also performs a transmission path setup with the RAN 302. For example, the chosen SM 308b may transmit, to the RAN 302, an initial context setup request that contains the UE ID, the SM ID, the session ID, the RAN tunnel endpoint ID (TEID) for uplink, and the RAN ID (S312). Then, the RAN 302 establishes a radio bearer with the UE 301 (S313) and may transmit an initial context setup response to the chosen SM 308b (S314). Here, the initial context setup response may contain the UE ID, the SM ID, the session ID, the RAN TEID [DL], and the RAN ID.

Upon reception of the initial context setup response, the chosen SM 308b performs a session modification request/response process with the UP NF 303 (S315). As a result, the transmission path setup is completed between the DN 304, the UP NF 303, the RAN 302, and the UE 301. When the transmission path setup is completed, the chosen SM 308b transmits, to the MM 307, a PDU session establishment response signaling including the UE ID, the DNN, the SM ID, the session ID, and the UE IP (S316), and the MM 307 may transmit a PDU session establishment response including the SM ID, the session ID, and the UE IP to the UE 301 (S317). Then, the UE 301 can transmit/receive uplink/downlink IP traffic (data communication) with the DN 304 through the set transmission path (S318).

Now, a PDU session release procedure according to an embodiment of the invention will be described with reference to FIG. 4. This procedure may be performed based on a request of the UE or SM. The procedure based on the request of the UE is performed sequentially from S401, and the procedure based on the request of the SM is performed from S403.

If there is at step S403 any session other than a session to be released, step S404 is skipped. On the other hand, if the session to be released is the last session for the UE, the MM 407 is requested to release the SM ID through step S404. The SM 408 that receives a request for a session release performs a process of releasing the transmission path previously set with the UP NF 403 and the RAN 402. When this is completed, the SM 408 finally transmits a signaling of release completion to the UE 401.

Specifically, referring to FIG. 4, the UE 401 transmits a PDU session release request to the MM 407 (S401). Here, the PDU session release request may contain a UE ID, an SM ID, and a session ID. The MM 407 may forward the PDU session release request received from the UE 401 to the SM 408 (S402).

The SM 408 may check the existing PDU session (S403) and perform signaling for the SM ID registration release to the MM 407 (S404). Here, the SM ID registration release may include the UE ID and the SM ID. In addition, the SM 408 may send a session release request including the UE ID, the SM ID and the session ID to the UP NF 403 (S405) and receive the session release response including the UE ID from the UP NF 403 (S406). Upon reception of the session release response, the SM 408 may send a session deactivation request to the MM 407 (S407). Here, the session deactivation request may include the UE ID, the SM ID, and the session ID. When the session deactivation request including the UE ID, the SM ID and the session ID is delivered from the MM 407 to the RAN 402 (S408), a radio bearer release procedure may be performed between the UE 401 and the RAN 402 (S409).

Thereafter, the RAN 402 transmits a session deactivation response including the UE ID, the SM ID, and the session ID to the MM 407 (S410), and the MM 407 may forward the session deactivation response including the UE ID, the SM ID and the session ID to the SM 408 (S411). In addition, when a PDU session release response including the UE ID, the SM ID and the session ID is received from the SM 408, the MM 407 transmits a signaling of the PDU session release response including the SM ID and the session ID to the UE 401 (S413).

Described with reference to FIG. 5 is a process for a control plane signaling connection with a network and a user plane transmission path setup when uplink (UL) traffic is generated in a terminal (UE) in an idle state.

The idle state may be defined depending on whether a signaling connection state between the UE and the cellular network is set up. For example, the UE may distinguish the idle state from a connected state, based on a radio resource control (RRC) connection state with a cellular base station. For this procedure, the UE that receives a paging message from the network due to occurrence of downlink (DL) traffic responds to the paging message.

FIG. 5 assumes that an NG1 signaling connection between the UE 501 and the MM 507 and an NG2 signaling connection between the RAN 502 and the MM 507 have been set up. First, the UE 501 transmits, to the MM 507, a signaling of a service request that indicates which SM the traffic generated by the application layer is to be forwarded to (S501). At this time, the UE 501 may transmit, to the SM 508 managing a corresponding PDU session, a service request including information for identifying the PDU session to activate a user plane (UP) connection of the PDU session.

For example, the PDU session identification information may be a PDU session ID, or a corresponding activation flag may be defined and used between the UE and the network. For example, FIG. 5 shows a case where the UE 501 inserts a UE ID and an SM ID, as information for identifying the PDU session, in the service request.

In addition, in order to handle a case where the SM 508 sets up a plurality of PDU sessions for the UE 501, the identification information of the PDU session may be unique within one SM. After the MM 507 receives the service request from the UE 501, an authentication and security procedure may be performed between the UE 501 and the SDM 505 (S502).

Then, based on the service request, the MM 507 transmits a UP path setup trigger message for setup of a user plane transmission path to the corresponding SM 508 (S503). Specifically, the MM 507 that receives the service request message from the UE 501 may confirm the PDU session identification information included in the service request and transmit a signaling for activating the UP connection to the SM 508 managing the session. Here, the UP path setup trigger message, which is the signaling for activating the UP connection, may include the UE ID and the RAN ID.

The SM 508 that receives the activation message for the PDU session may transmit, in order to activate a UP connection of the PDU session, an N2 session setup request signaling for the UP connection setup to the RAN 502 currently accessed by the UE 501. This signaling may be, for example, an initial context setup request signaling as shown in FIG. 5, and may contain the UE ID, the PDU session ID for session identification, information related to the tunnel of the UP NF (e.g., the UP address of the UP NF and the tunnel ID of the UP NF) required for uplink traffic transmission.

The RAN 502 that receives the signaling may allocate resources for setting up the N3 tunnel with the UP NF 503, and perform, with the UE, a procedure (radio bearer establishment) of generating a DRB that can satisfy the QoS of the PDU session (S505). When the step S505 is completed, the UE 501 may send uplink (UL) traffic to the UP NF 503 via the RAN 502.

Thereafter, the RAN 502 may generate an N2 session setup response signaling to be delivered to the SM 508, including the RAN tunnel identification information set for the N3 tunnel setup. The N2 session setup response signaling (shown as an initial context setup response signaling) may be transmitted to the MM 507, and then the MM 507 may check the PDU session identification information and forward the signaling to the SM 508 (S506).

In addition, the SM 508 may transmit a session modification request signaling to the UP NF 503 (S507), and the UP NF 503 may transmit a session modification response to the SM 508. Then, downlink (DL) traffic may be transmitted from the UP NF 503 to the UE 501. Specifically, at step S507, the SM 508 may transmit the RAN tunnel identification information received at step S506 to the UP NF 503, so that the N3 tunnel setup can be completed between the RAN 502 of the PDU session and the UP NF 503. At step S508, the UP NF 503 may transmit an N4 session modification response message for the N4 session modification request signaling received at step S507.

Through the procedure of FIG. 5, even in case of having a plurality of PDU sessions, the UE can selectively activate only the UP connection of a specific PDU session.

FIG. 6 is a diagram illustrating a process of an idle-state terminal to receive downlink traffic from a data network (DN) according to an embodiment of the present invention.

Specifically, the UP NF 603 that receives the DN traffic may transmit a DL data notification signaling to notify the arrival of DL data to the SM 608 managing the corresponding PDU session (S601). At this time, for cases where one SM 608 manages a plurality of PDU sessions for the same UE, the above signaling may contain the ID of the corresponding PDU session together with the UE ID.

In addition, the DL data notification message may be forwarded from the SM 608 to the MM 607 managing the mobility of the UE 601 (S602). Thereafter, for an NG3 setup trigger, the MM 607 may register the ID of the SM 608 that sent the DL data notification (S603). This is because, even if a service request in which an SM ID is not specified is received from the UE when a UE triggered service request procedure is performed, it is possible to send a UP path setup trigger for setup of the user plane to the SM corresponding to a stored SM ID.

At step S603, the MM 507 may store the PDU session identification information included in the DL data notification message, and transmit a DL data notification response (ack) including the UE ID to the SM 608 (S604). Then, the SM 508 may transmit the DL data notification ack to the UP NF 603 (S605). In addition, the MM 507 transmits paging including the UE ID to the RAN 602 (S606), and the RAN 602 transmits the paging to the UE 601 (S607).

Accordingly, a UE triggered service request procedure is performed between the UE 601, the RAN 602, the MM 607, the SM 608, and the UP NF 603 (S608). For example, when receiving the service request message transmitted from the UE 601, the MM 607 may transmit a signaling for activating the UP connection to the corresponding SM 608 for the stored PDU session. The subsequent operations for completing the UP connection setup may be as described in FIG. 5.

Through FIGS. 5 and 6 as described above, the UE can re-establish only the UP path (or connection) of the PDU session requiring traffic transmission, so that it is possible to effectively utilize the network resources for the UP connection unlike the service quest of the existing LTE.

Figure 7:
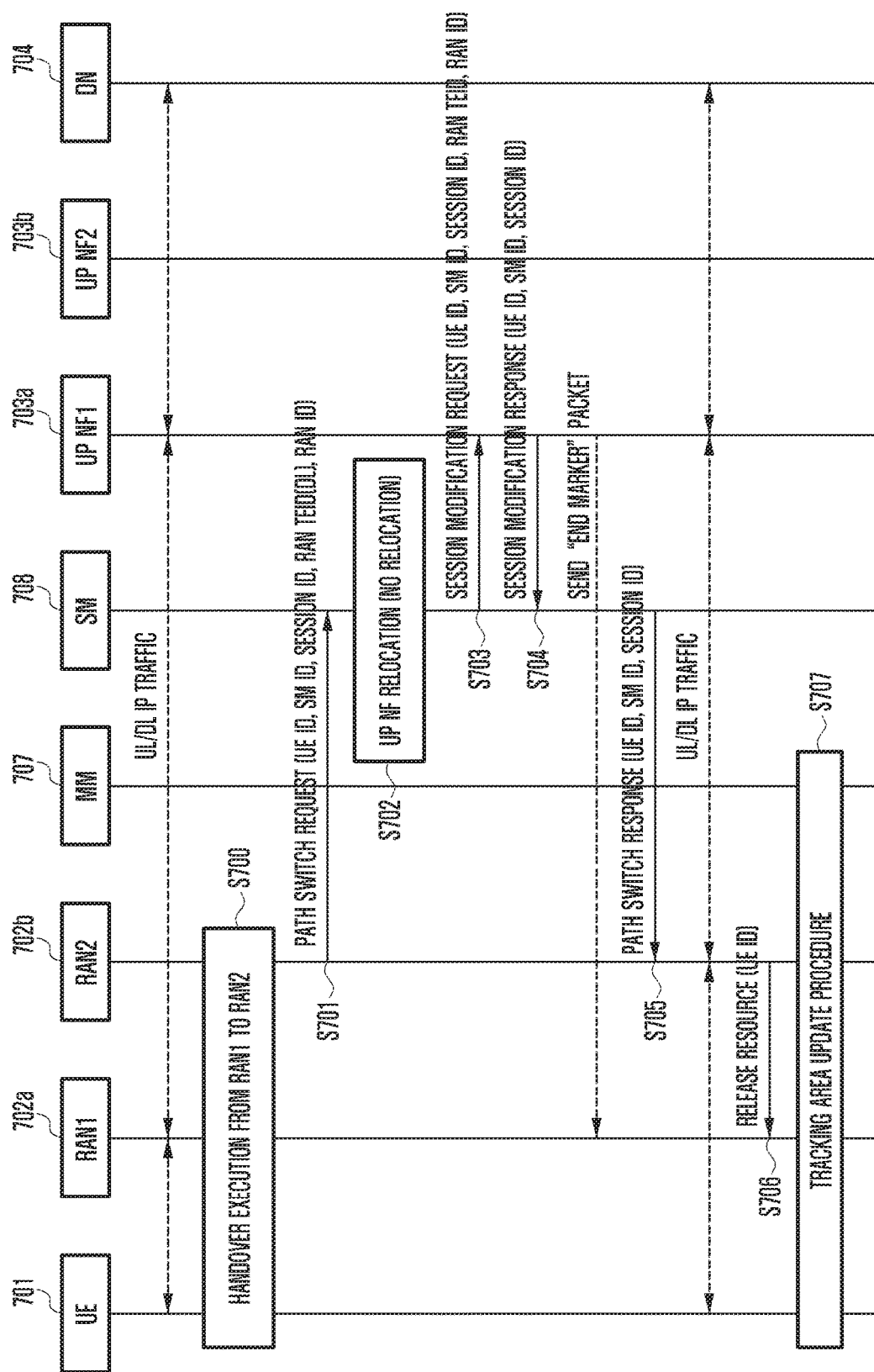
FIG. 7 is a diagram illustrating a handover procedure in case where there is an X2 interface between a source base station and a target base station in a MM/SM separated core structure according to an embodiment of the present invention.

FIG. 7 is a diagram illustrating a handover procedure in case where there is an X2 interface between a source base station (source RAN, e.g., RAN1) and a target base station (target RAN, e.g., RAN2) in a MM/SM separated core structure according to an embodiment of the present invention.

First, uplink and downlink traffic (UL/DL traffic) may be transmitted and received between the UE 701, the RAN1 702*a*, the UP NF1 703*a*, and the DN 704. At this time, a procedure of executing a handover between the UE 701, the RAN1 702*a*, and the RAN2 702*b*, that is, from the RAN1 702*a* to the RAN2 702*b*, may be performed (S700). In this handover execution step, it is assumed that a RAN ID update of the MM 707 is also performed.

When the handover is executed, a path switch request may be transmitted from the RAN2 702*b* to the SM 708. At this time, the path switch request may include a UE ID, a SM ID, a session ID, a TEID [DL] for the RAN2, and a RAN ID. Here, the path switch request is sent only to the SM where the UP path is set up.

The SM 708 may determine whether to perform a UP NF relocation triggered by the path switch request (S702). In this embodiment, the case of no relocation of the UP NF will be described. In case where the relocation of the UP NF is required, the SM 708 can proceed with additional procedures.

The SM 708 transmits a session modification request including the UE ID, the SM ID, the session ID, the RAN TEID, and the RAN ID to the UP NF1 703*a* (S703), and receives a session modification response including the UE ID, the SM ID, and the session ID from the UP NF1 703*a* (S704). At this time, the UP NF1 703*a* may send an "end marker" packet to the RAN1 702*a*. Then, the SM 708 may send a path switch response including the UE ID, the SM ID, and the session ID to the RAN2 702*b* (S705).

When the above process is completed, the UE 701 may perform transmission and reception of UL/DL traffic with the RAN2 702*b*, the UP NF1 703*a*, and the DN 704. In addition, the RAN2 702*b* may transmit a release resource signaling including the UE ID to the RAN1 702*a* (S706), and a tracking area update procedure may be performed between the UE 701, the RAN1 702*a*, the RAN2 702*b*, and the MM 707 (S707).

Figure 8:
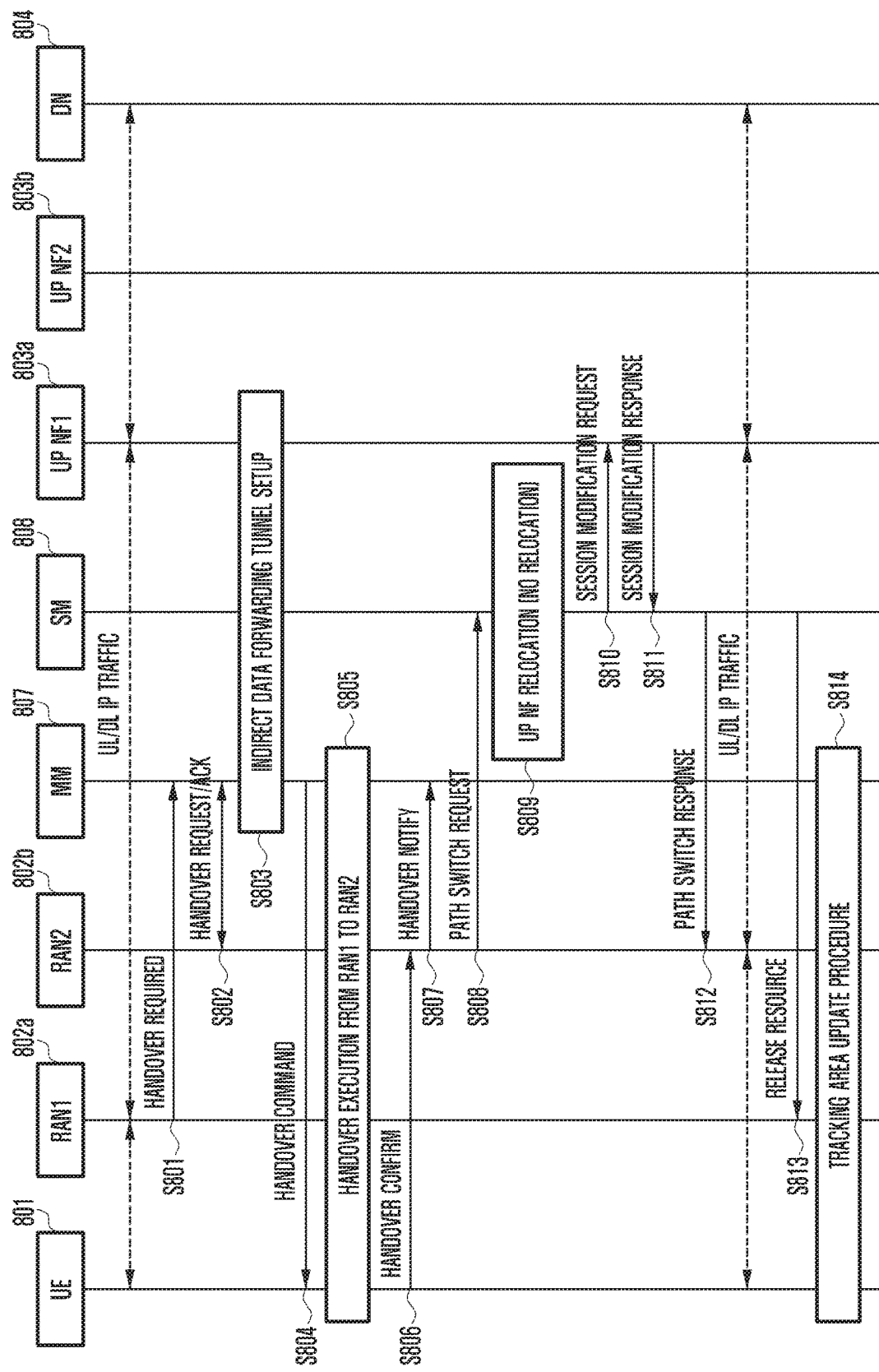
FIG. 8 is a diagram illustrating a handover procedure in case where there is no X2 interface between a source base station and a target base station in a MM/SM separated core structure according to an embodiment of the present invention.

FIG. 8 shows a handover procedure from the RAN1 to the RAN2 by using the MM in case where there is no X2 interface. As in FIG. 7, when the UE attaches to the RAN2, the RAN2 sends a path switch request only to the SM in which the transmission path is set between the RAN and the UP NF.

Referring to FIG. 8, UL/DL traffic may be transmitted/received between the UE 801, the RAN1 802*a*, the UP NF1 803*a*, and the DN 804. At this time, the RAN1 802*a* may transmit a signaling to the MM 807 to inform a handover required (S801). Based on this signaling, the MM 807 may perform a handover request/ack procedure with the RAN2 802*b* (S802). At this step S802, the RAN ID may be updated in the MM 807.

Thereafter, an indirect data forwarding tunnel setup procedure may be performed between the MM 807, the SM 808, and the UP NF1 803*a* (S803). In addition, a signaling of a handover command may be transmitted from the MM 807 to the UE 801 (S804). Accordingly, a handover from the RAN1 802*a* to the RAN2 802*b* is performed between the UE 801, the RAN1 802*a*, the RAN2 802*b*, and the MM 807 (S805).

The UE 801 transmits a handover confirm signaling to the RAN2 802*b* (S806). The RAN2 802*b* transmits a handover notify signaling to the MM 807 (S807) and transmits a path switch request to the SM 808 (S808).

The SM 808 may determine whether to perform a UP NF relocation triggered by the path switch request (S809). In this embodiment, the case of no relocation of the UP NF will be described. In case where the relocation of the UP NF is required, the SM 808 can proceed with additional procedures.

In addition, the SM 808 may transmit a session modification request to the UP NF1 803*a* (S810), and may receive a session modification response from the UP NF1 803*a* (S811).

Thereafter, when a path switch response is transmitted (S812) to the RAN2 802*b* by the SM 808, the UE 801 may perform transmission/reception of UL/DL traffic with the RAN2 802*b*, the UP NF1 803*a*, and the DN 804. In addition, the SM 808 may transmit a release resource signaling to the RAN1 802*a* (S813), and a tracking area update procedure may be performed between the UE 801, the RAN1 802*a*, the RAN2 802*b*, and the MM 807 (S814).

Figure 9:
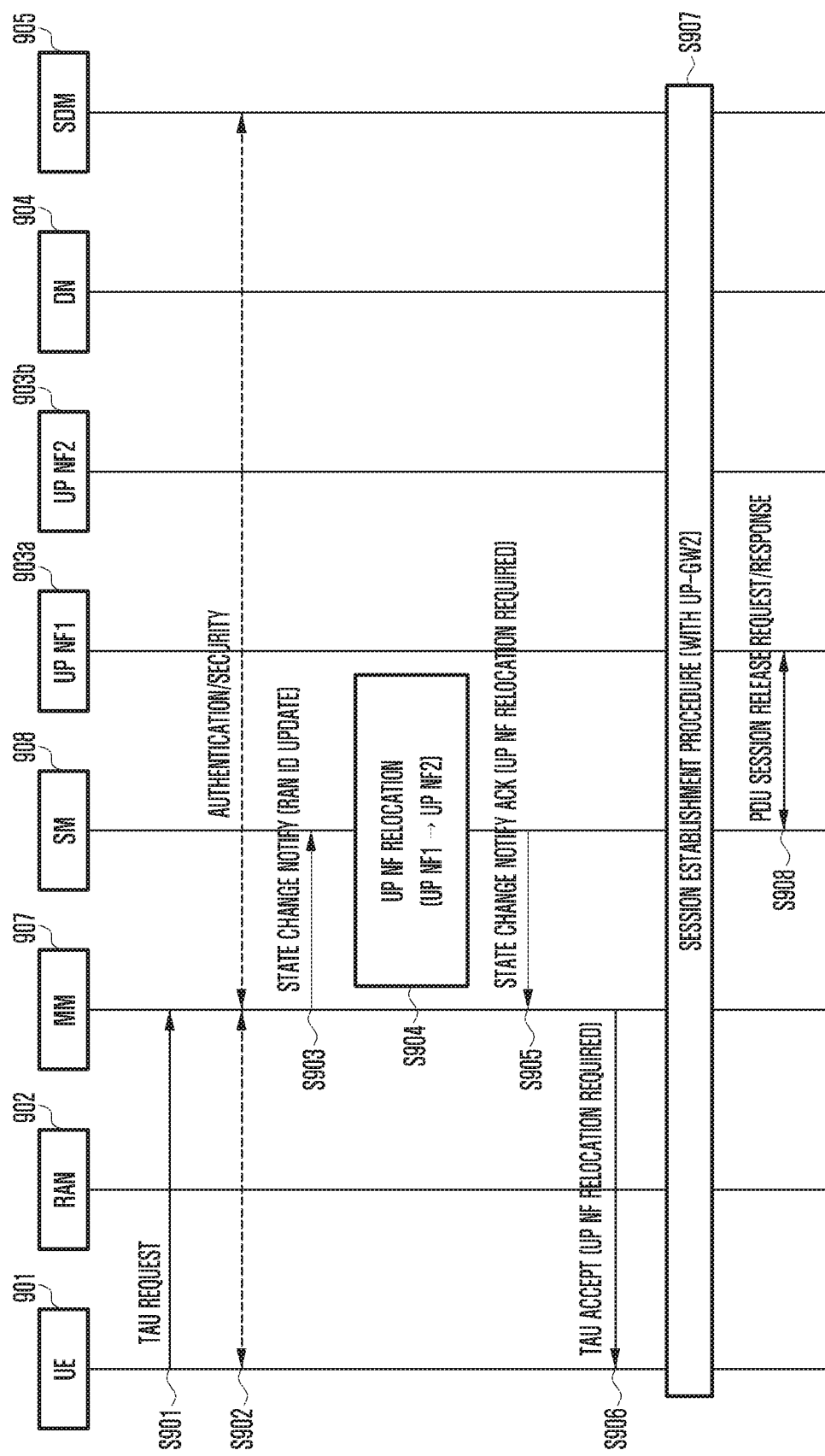
FIG. 9 is a diagram illustrating a TAU procedure for updating a location of a terminal in a network according to an embodiment of the present invention.

FIG. 9 is a diagram illustrating a tracking area update (TAU) procedure for updating a location of a terminal (UE) in a network (e.g., MM) according to an embodiment of the present invention.

First, the UE 901 may transmit a TAU request to the MM 907 (S901). In addition, the UE 901 may perform an authentication and security procedure between the MM 907 and the SDM 905.

If the UE location is changed at the RAN level (or cell level), the MM 907 sends a state change notify message to all SMs 908 associated with the UE 901 (S903). At this time, the state change notify message may include RAN ID update information.

The SM 908 that receives this message determines whether to perform UP NF relocation (S904). If the UP NF relocation is required, for example, if the relocation from the UP NF1 903a to the UP NF2 903b is required, this is written in a state change notify ack message and sent to the MM 907 (S905). Upon reception of the state change notify ack message, the MM 907 transmits a TAU accept message to the UE 901 (S906). Here, the TAU accept message sent to the UE 901 may include (piggyback) the UP NF relocation required information and the UN NF relocation information.

Thereafter, a session establishment procedure is performed between the UE 901, the RAN 902, the MM 907, the SM 908, the UP NF1 903a, the UP NF2 903b, the DN 904, and the SDM 905 (S907), and the SM 908 performs a PDU session release request/response process with the UP NF1 903a S908).

Figure 10:
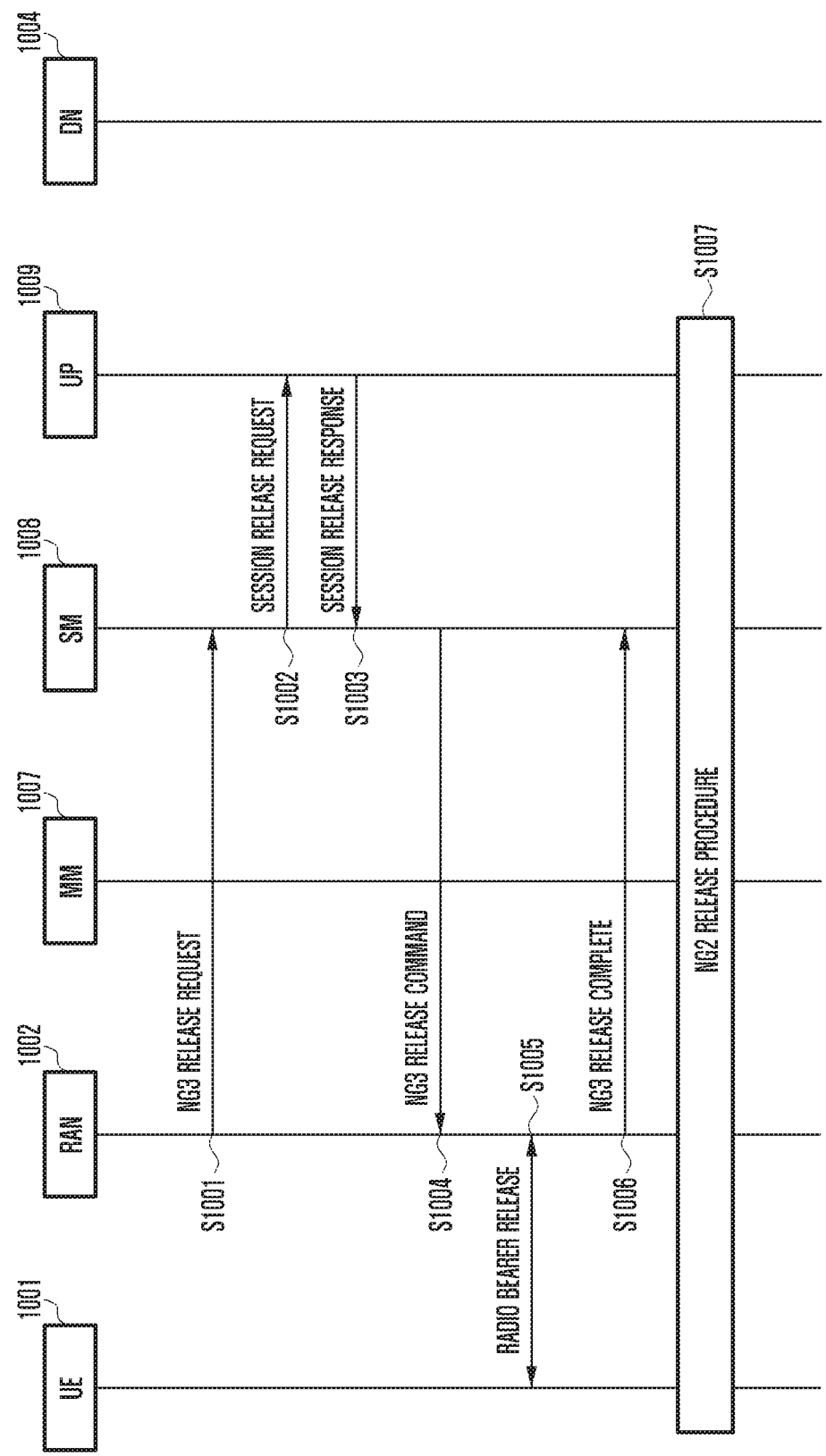
FIG. 10 is a diagram illustrating a base station operation when there is no data transmission for a given time in a state where a PDU session is set up in a terminal according to an embodiment of the present invention.

FIG. 10 shows a process of deleting a data transmission path by a base station (RAN) when the data transmission is not performed for a specific time (for example, in case of user traffic inactivity) through a user plane (UP) transmission path of a PDU session already set up for a specific terminal (UE). As described in FIG. 1, the NG3 interface is responsible for the transmission path between the RAN and the UP NF, so this procedure will be referred to as NG3 release. However, the name of the procedure may be changed.

Referring to FIG. 10, the RAN 1002 accessed by the UE 1001 may transmit an NG3 release request to the SM 1008 (S1001). For example, the RAN 1002 operates a data inactivity timer for each PDU session, and if there is no traffic until the timer expires, may transmit, to the MM 1007, the NG3 release request signaling including identification information for a PDU session in which no traffic occurs. The MM 1007 that receives the signaling confirms the PDU session identification information and forwards the request signaling to the SM 1008 that manages the corresponding PDU session.

In response to this, the SM 1008 sends a signaling for releasing the transmission path set for the UP NF 1003 and the RAN 1002. Specifically, the SM 1008 may transmit a N3 tunnel release signaling (e.g., release session request signaling) to the UP NF 1003 responsible for data transmission of the PDU session (S1002). Upon receiving the signaling, the UP NF 1003 may transmit a release session response signaling to the SM 1008 (S1003).

Thereafter, the SM 1008 may transmit, to the RAN 1002, a signaling including an NG3 release command allocated for the N3 tunnel of the corresponding PDU session (S1004). Then, the RAN 1002 may perform a signaling exchange such as RRC connection reconfiguration with the UE 1001 to release the DRB corresponding to the session. For example, the RAN 1002 may send a radio bearer release signaling to the UE 1001 (S1005).

In case of succeeding in releasing resources for all UP connections for the corresponding PDU session, the RAN 1002 may transmit a response signaling to the SM 1008 via the MM 1007. For example, the RAN 1002 may send an NG3 release complete signaling to the SM 1008 via the MM 1007.

If all the NG3 set for the UE 1001 is released, the UE 1001 further proceeds with an NG2 release with the MM 1007 (S1007) to release a non access stratum (NAS) connection and thereby completely enter an idle state.

Figure 11:
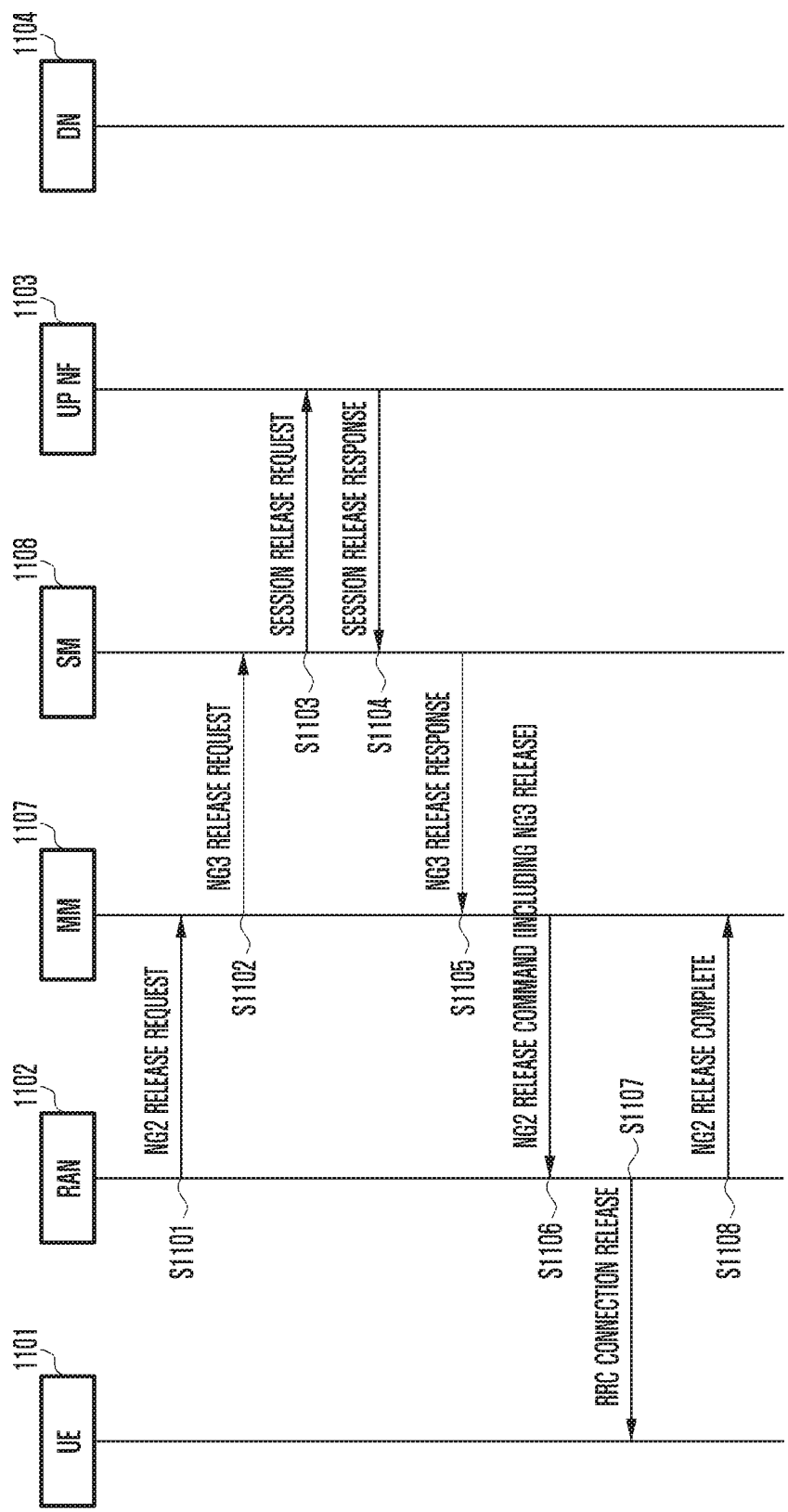
FIG. 11 is a diagram illustrating a procedure for releasing a signaling connection between a terminal and an MM according to an embodiment of the present invention.

FIG. 11 is a diagram illustrating a procedure for releasing a signaling connection between a terminal (UE) and an MM according to an embodiment of the present invention.

The RAN 1102 may transmit an NG2 release request to the MM 1107 (S1101). If there is a non-released NG3 when this procedure is performed, the RAN 1102 inserts the SM ID responsible for the non-released NG3 into the NG2 release request. For example, the RAN 1102 may further insert PDU session identification information (e.g., PDU session ID) in the request and send it to the MM 1107.

In response to the above signaling, the MM 1107 may transmit an NG3 release request signaling to the SM 1108 (S1102). If one SM 1108 manages a plurality of PDU sessions for one UE, the MM 1107 can correctly identify such PDU sessions, based on the PDU session identification information. Then, the MM 1107 may send an NG3 release request to the identified SM 1108.

The SM 1108 that receives the NG3 release request transmits a release session request to the UP NF 1103 (S1103), and receives a release session response from the UP NF 1103 (S1104).

Then, the MM 1107 that receives the NG3 release response from the SM 1108 sends an NG2 release command message to the RAN 1102 (S1106). At this time, the NG2 release command message may include an NG3 release command to release NG3 resources of the RAN 1102.

The RAN 1102 that receives the NG2 release command transmits an RRC connection release signaling to the UE 1101 (S1107), and also transmits an NG2 release complete signaling to the MM 1107 (S1108).

Figure 12:
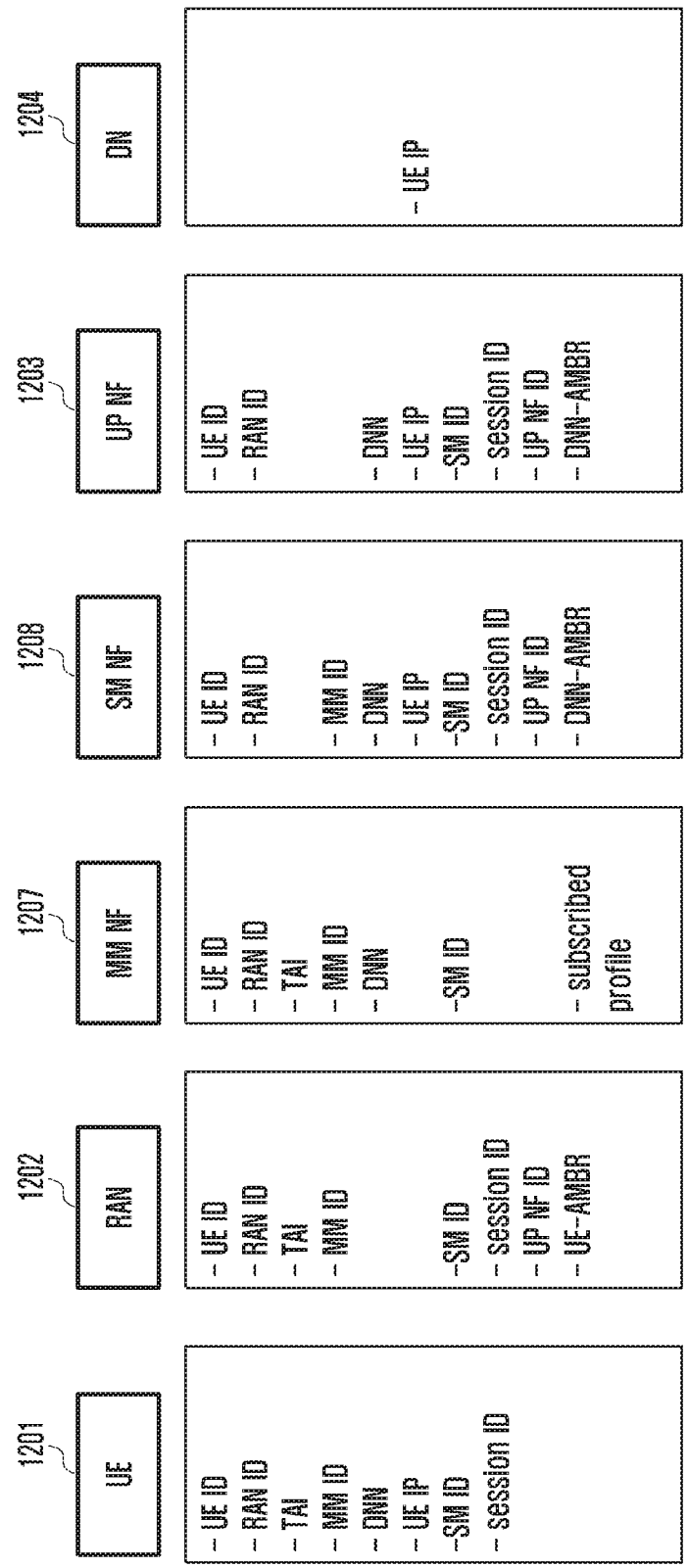
FIG. 12 is a diagram illustrating necessary information for each entity to perform a process according to an embodiment of the present invention.

FIG. 12 shows information necessary for the above-described procedure for each entity. Each of the UE 1201 and the RAN 1202 separately manages the MM ID and the SM ID, thereby distinctively transmitting a signaling associated with the MM 1207 and a signaling associated with the SM 1208.

Through the above-described procedure, the UE 1201 and the RAN 1202 may manage state information on the PDU session for each SM 1208. That is, it is possible to manage NG3 distinctively in case of being set up and in case of being released.

Figure 13:
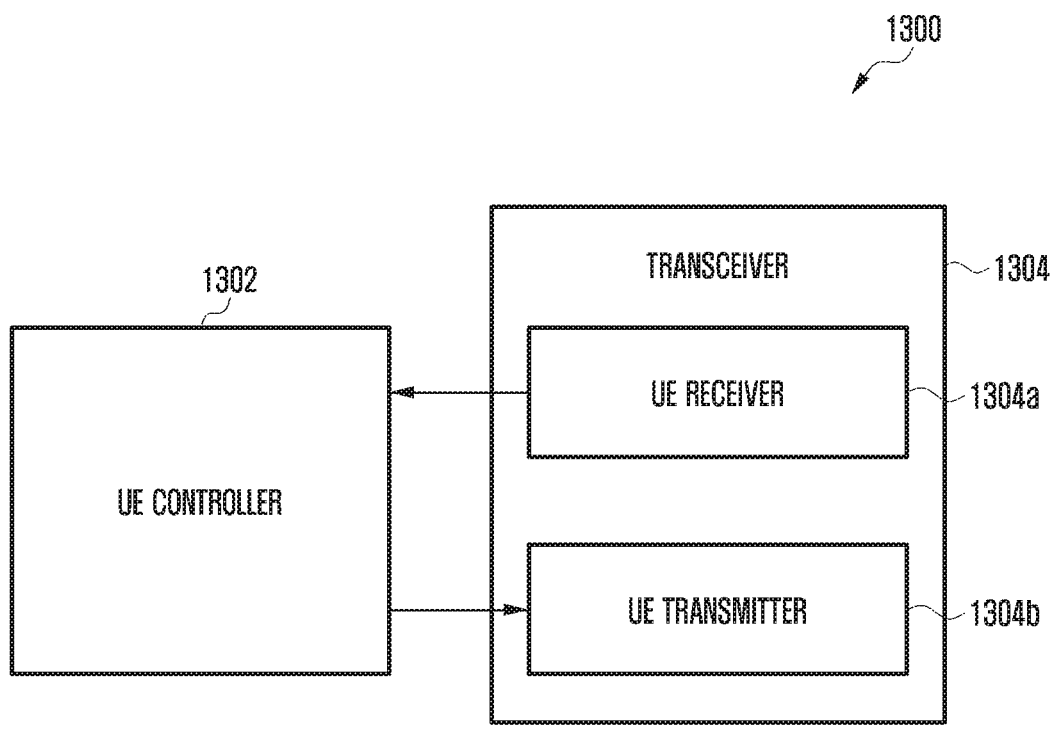
FIG. 13 is a block diagram illustrating a configuration of a terminal according to an embodiment of the present invention.

FIG. 13 is a block diagram illustrating a configuration of a terminal (UE) according to an embodiment of the present invention. Referring to FIG. 13, the UE 1300 according to an embodiment of the invention may include a UE controller 1302 and a UE transceiver 1304. Also, the UE transceiver 1304 may include a UE receiver 1304a and a UE transmitter 1304b.

The UE transceiver 1304 according to an embodiment of the invention may perform all the functions related to the transmission/reception operation of the UE in embodiments described with reference to FIGS. 1 to 12. For example, the UE transceiver 1304 may transmit or receive a radio signal to or from a base station (RAN). The radio signal may include control information and data. For example, when a radio bearer is formed according to an embodiment of the invention, data may be transmitted to the base station through the radio bearer.

Although not shown in the drawings, the UE transmitter 1304b may include an RF transmitter for up-converting and amplifying a transmitted signal, and the UE receiver 1304*a* may include an RF receiver for low-noise-amplifying and down-converting a received signal. In addition, the UE transceiver 1304 may receive a signal through a radio channel and output the signal to the UE controller 1302, and also transmit a signal outputted from the UE controller 1302 through a radio channel.

In addition, the UE controller 1302 may control a series of processes so that the UE can operate according to the above-described embodiments of the invention. For example, the UE controller 1302 may select a Protocol Data Unit (PDU) session for transmission of data from among at least one inactivated PDU session, and control the transceiver 1304 to transmit a service request message including identification information of the selected session to a mobility management function element for managing mobility of the UE. Also, the UE controller 1302 may control the transceiver 1304 to transmit the data through the selected PDU session activated based on the service request message.

Figure 14:
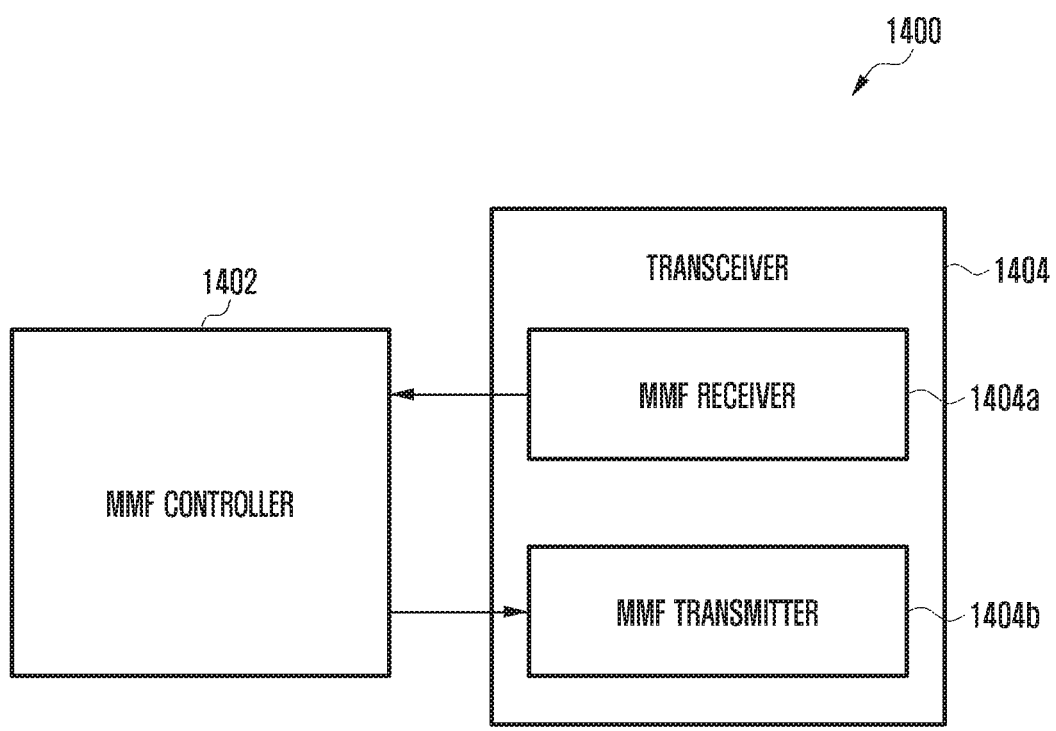
FIG. 14 is a block diagram illustrating a configuration of a mobility management function element according to an embodiment of the present invention.

FIG. 14 is a block diagram illustrating a configuration of a mobility management function (MMF) element according to an embodiment of the present invention. Referring to FIG. 14, the MMF 1400 according to an embodiment of the invention may include an MMF controller 1402 and an MMF transceiver 1404. Also, the MMF transceiver 1404 may include an MMF receiver 1404*a* and an MMF transmitter 1404*b*.

The MMF transceiver 1404 according to an embodiment of the invention may perform all the functions related to the transmission/reception operation of the MMF element in embodiments described with reference to FIGS. 1 to 12. For example, the MMF transceiver 1404 may receive, from the UE, a service request message including identification information of a specific PDU session. Also, the MMF transceiver 1404 may transmit, to a specific session management function element corresponding to the identification information of the specific PDU, a path setup trigger message for data transmission to a user plane network function element of the UE.

In addition, the MMF controller 1402 may control a series of processes so that the MMF can operate according to the above-described embodiments of the invention. For example, when a signaling related to path setup from a specific session management function element, the MMF controller 1402 may control the transceiver 1404 to forward the signaling to the base station (RAN).

Figure 15:
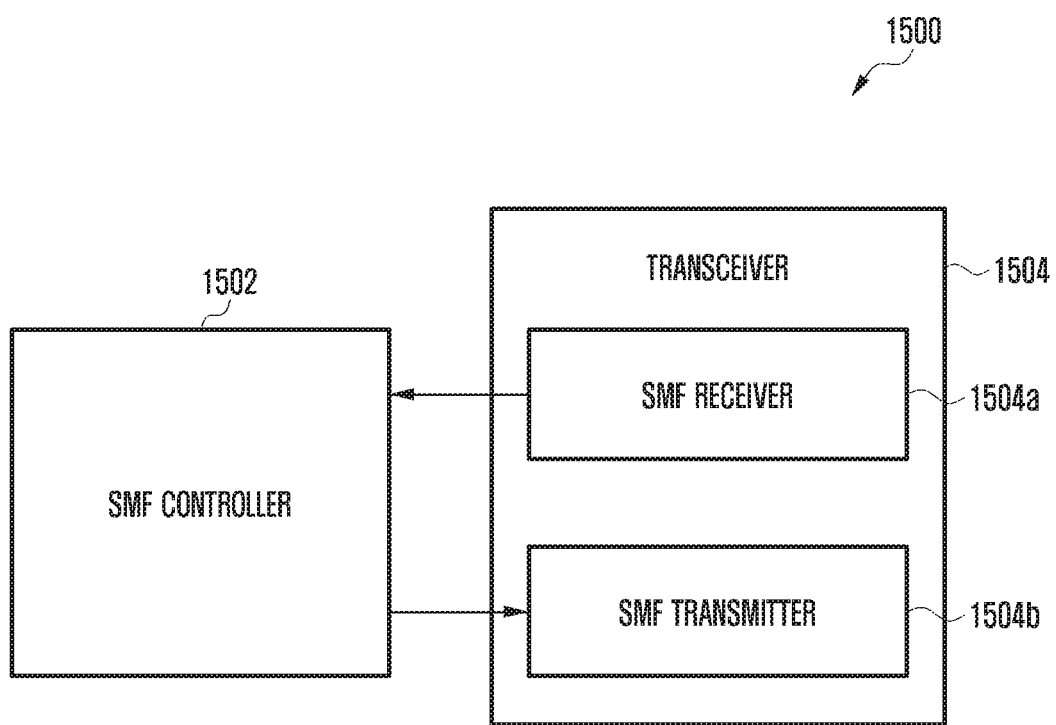
FIG. 15 is a block diagram illustrating a configuration of a session management function element according to an embodiment of the present invention.

FIG. 15 is a block diagram illustrating a configuration of a session management function (SMF) element according to an embodiment of the present invention. Referring to FIG. 15, the SMF 1500 according to an embodiment of the invention may include an SMF controller 1502 and an SMF transceiver 1504. Also, the SMF transceiver 1504 may include an SMF receiver 1504*a* and an SMF transmitter 1504*b*.

The SMF transceiver 1504 according to an embodiment of the invention may perform all the functions related to the transmission/reception operation of the SMF element in embodiments described with reference to FIGS. 1 to 12. For example, the SMF transceiver 1504 may receive, from a mobility management function element for managing mobility of UE, a path setup trigger message for data transmission to a user plane network function element of the UE. Also, the SMF transceiver 1504 may transmit signaling related to the path setup to the mobility management function element.

In addition, the SMF controller 1502 may control a series of processes so that the SMF can operate according to the above-described embodiments of the invention. For example, when a signaling related to path setup from a mobility management function (MMF) element, the SMF controller 1502 may control the transceiver 1504 to transmit the signaling to the MMF.

Embodiments disclosed in the present specification and drawings are only illustrative of specific examples in order to facilitate description and understanding of the technical contents, and are not intended to limit the scope of the present invention. It is to be understood by those skilled in the art that other modifications based on the technical idea of the present invention are possible in addition to the embodiments disclosed herein.

While this disclosure contains many specific implementation details, these should not be construed as limitations on the scope of the invention or of what may be claimed, but rather as descriptions of features that may be specific to particular embodiments of particular invention.

The invention claimed is:

1. A method for supporting a protocol data unit (PDU) session by an access and mobility management function (AMF), the method comprising:
 receiving, from a terminal via a base station, a request message for requesting an PDU session establishment, the request message including a data network name (DNN) and information related to a PDU session including a type of the PDU session, and a session and service continuity (SSC) mode;
 selecting a session management function (SMF) based on the request message;
 transmitting, to the selected SMF, a first message, including the DNN, the information related to the PDU session and an ID of the AMF, for establishing the PDU session between the terminal and a data network,
 receiving, via the base station from the terminal, a PDU session release request message for the PDU session, after the PDU session is established based on the request message;
 transmitting, to the selected SMF, the PDU session release request message; and
 receiving, from the selected SMF, a message indicating a release of the PDU session associated with an ID of the selected SMF.

2. The method of claim 1, wherein the PDU session is established further based on the following steps:
 receiving, from the selected SMF, a second message in response to the first message including an ID of the PDU session and an ID of a tunnel;
 transmitting, to the base station, a third message including the ID of the PDU session and the ID of the tunnel;
 receiving, from the base station, a response message for the third message including information related to the tunnel; and
 transmitting, to the selected SMF, a fourth message including the information related to the tunnel.

3. The method of claim 2,
 wherein the information related to the PDU session further includes an internet protocol (IP) address of the base station, and
 wherein a user plane function (UPF) associated with the PDU session is selected by the selected SMF based on the first message.

4. The method of claim 3,
 wherein the tunnel is an N3 tunnel between the base station and the UPF, and
 wherein radio resources for the PDU session are established between the base station and the terminal based on the third message.

5. The method of claim 2,
wherein a user plane connection for the PDU session includes a data radio bearer (DRB) and the tunnel between the base station and a user plane function (UPF), and
wherein the DRB is established between the terminal and the base station based on a quality of service (QoS) information.

6. A method for supporting a protocol data unit (PDU) session by a session management function (SMF), the method comprising:
receiving, from an access and mobility management function (AMF), a first message for establishing a PDU session between a terminal and a data network including a data network name (DNN), information related to the PDU session and an ID of the AMF, wherein the information related to the PDU session includes a type of the PDU session, and a session and service continuity (SSC) mode, and wherein the DNN and the information related to the PDU session are obtained by the AMF from the terminal;
performing a registration for the PDU session using an ID of the SMF, based on the first message;
receiving, from the AMF, a PDU session release request message transmitted from the terminal to the AMF via a base station, after the PDU session is established based on the first message; and
transmitting, to the AMF, a message indicating a release of the PDU session associated with an ID of the SMF.

7. The method of claim 6, wherein the PDU session is established further based on the following steps comprising:
transmitting, to the AMF, a second message in response to the first message including an ID of the PDU session and an ID of a tunnel; and
receiving, from the AMF, a context related message including information related to a tunnel,
wherein a third message includes the ID of the PDU session and the ID of the tunnel is transmitted from the AMF to the base station, and
wherein the information related to the tunnel is transmitted from the base station to the AMF.

8. The method of claim 7, further comprising:
transmitting, to the a user plane function (UPF) an session establishment request message for the PDU session; and
receiving, from the UPF, a response message for the session establishment request message.

9. The method of claim 7,
wherein the tunnel is an N3 tunnel between the base station and a user plane function (UPF), and
wherein radio resources for the PDU session are established between the base station and the terminal based on the PDU session request message.

10. The method of claim 7,
wherein a user plane connection for the PDU session includes a data radio bearer (DRB) and the tunnel between the base station and a user plane function (UPF), and
wherein the DRB is established between the terminal and the base station based on a quality of service (QoS) information.

11. An access and mobility management function (AMF) for supporting a protocol data unit (PDU) session, the AMF comprising:
a transceiver configured to transmit and receive signals; and
a controller configured to:
control the transceiver to receive, from a terminal via a base station, a request message for requesting an PDU session establishment, the request message including a data network name (DNN) and information related to a PDU session including a type of the PDU session, and a session and service continuity (SSC) mode,
select a session management function (SMF) based on the request message,
control the transceiver to transmit, to the selected SMF, a first message, including the DNN, the information related to the PDU session and an ID of the AMF, for establishing the PDU session between the terminal and a data network,
control the transceiver to receive, via the base station from the terminal, a PDU session release request message for the PDU session, after the PDU session is established based on the request message,
control the transceiver to transmit, to the selected SMF, the PDU session release request message, and
control the transceiver to receive, from the selected SMF, a message indicating a release of the PDU session associated with an ID of the selected SMF.

12. The AMF of claim 11, wherein the controller is further configured to:
control the transceiver to receive, from the selected SMF, a second message in response to the first message including an ID of the PDU session and an ID of a tunnel;
control the transceiver to transmit, to the base station, a third message including the ID of the PDU session and the ID of the tunnel;
control the transceiver to receive, from the base station, a response message for the third message including information related to the tunnel; and
control the transceiver to transmit, to the selected SMF, a fourth message including the information related to the tunnel.

13. The AMF of claim 12,
wherein the information related to the PDU session further includes an internet protocol (IP) address of the base station, and
wherein a user plane function (UPF) associated with the PDU session is selected by the selected SMF based on the first message.

14. The AMF of claim 13,
wherein the tunnel is an N3 tunnel between the base station and the UPF, and
wherein radio resources for the PDU session are established between the base station and the terminal based on the third message.

15. The AIVIF of claim 11,
wherein a user plane connection for the PDU session includes a data radio bearer (DRB) and a tunnel between the base station and a user plane function (UPF), and
wherein the DRB is established between the terminal and the base station based on a quality of service (QoS) information.

16. A session management function (SMF) for supporting a protocol data unit (PDU) session, comprising:
- a transceiver configured to transmit and receive signals; and
- a controller configured to:
  - control the transceiver to receive, from an access and mobility management function (AMF), a first message for establishing a PDU session between a terminal and a data network including a data network name (DNN), information related to the PDU session, and an ID of the AMF, wherein the information related to the PDU session includes a type of the PDU session, and a session and service continuity (SSC) mode, and wherein the DNN and the information related to the PDU session are obtained by the AMF from the terminal, and
  - perform a registration for the PDU session using an ID of the SMF, based on the first message,
  - control the transceiver to receive, from the AMF, a PDU session release request message transmitted from the terminal to the AMF via a base station, after the PDU session is established based on the first message, and
  - control the transceiver to transmit, to the AMF, a message indicating a release of the PDU session associated with an ID of the SMF.

17. The SMF of claim 16,
wherein the controller is further configured to control the transceiver to:
- transmit, to the AMF, a second message in response to the first message including an ID of the PDU session and an ID of a tunnel, and
- receive, from the AMF, a context related message including information related to a tunnel,
wherein a third message includes the ID of the PDU session and the ID of the tunnel is transmitted from the AMF to the base station, and
wherein the information related to the tunnel is transmitted from the base station to the AMF.

18. The SMF of claim 17,
wherein the controller is further configured to control the transceiver to:
- transmit, to a user plane function (UPF), a session establishment request message for the PDU session, and
- receive, from the UPF, a response message for the session establishment request message.

19. The SMF of claim 17,
wherein the tunnel is an N3 tunnel between the base station and a user plane function (UPF), and
wherein radio resources for the PDU session are established between the base station and the terminal based on the PDU session request message.

20. The SMF of claim 17,
wherein a user plane connection for the PDU session includes a data radio bearer (DRB) and the tunnel between the base station and a user plane function (UPF), and
wherein the DRB is established between the terminal and the base station based on a quality of service (QoS) information.

* * * * *